(12) United States Patent
Russo

(10) Patent No.: US 7,886,452 B1
(45) Date of Patent: Feb. 15, 2011

(54) MITRE TOOL GUIDE

(76) Inventor: Adolph Russo, 19429 Marwood Ave., Cleveland, OH (US) 44135

( * ) Notice: Subject to any disclaimer, the term of this patent is extended or adjusted under 35 U.S.C. 154(b) by 0 days.

(21) Appl. No.: 12/831,236

(22) Filed: Jul. 6, 2010

Related U.S. Application Data

(63) Continuation-in-part of application No. 12/694,523, filed on Jan. 27, 2010, now Pat. No. 7,774,947.

(51) Int. Cl.
*B43L 7/10* (2006.01)
(52) U.S. Cl. ............................. 33/455; 33/534
(58) Field of Classification Search .................. 33/455, 33/456, 534, 520, 644, 640, 471, 418, 428, 33/452
See application file for complete search history.

(56) References Cited

U.S. PATENT DOCUMENTS

| | | | |
|---|---|---|---|
| 797,453 A | 8/1905 | Nagel | |
| 963,274 A | 7/1910 | Bundy | |
| 2,330,414 A | 9/1943 | Elwert | |
| 2,607,121 A | 8/1952 | Wiedebusch | |
| 3,562,919 A * | 2/1971 | Green | 33/25.1 |
| 3,709,266 A | 1/1973 | Fusco | |
| 4,527,341 A | 7/1985 | Schön | |
| 5,461,798 A * | 10/1995 | Ribeiro | 33/562 |
| 5,473,821 A | 12/1995 | DiMarco | |
| 6,604,294 B1 | 8/2003 | Farley | |
| 6,877,238 B2 | 4/2005 | Kanaga | |
| 7,082,694 B2 | 8/2006 | Lyman, Jr. | |
| 7,373,727 B2 * | 5/2008 | Bruce | 33/455 |
| 2004/0237320 A1 | 12/2004 | Kanaga | |
| 2006/0130348 A1 | 6/2006 | Lyman, Jr. | |
| 2007/0022856 A1 | 2/2007 | Paine | |

OTHER PUBLICATIONS

Office Action in U.S. Appl. No. 12/694,523 mailed by USPTO on May 18, 2010.
Response to Office Action in U.S. Appl. No. 12/694,523 electronically filed with the USPTO on May 27, 2010.
Notice of Allowability mailed Jun. 7, 2010 from USPTO regarding U.S. Appl. No. 12/694,523.

* cited by examiner

*Primary Examiner*—Yaritza Guadalupe-McCall
(74) *Attorney, Agent, or Firm*—Curatolo Sidoti Co., LPA; Salvatore A. Sidoti

(57) ABSTRACT

A tool and method for making precision cuts with conventional saws and other woodworking machines. The shape of an inside or outside corner of a construction, such as a wall construction, is obtained with the tool, and the tool is used to as a guide to set the blade of the cutting apparatus to the proper cutting position. The tool may be used to indicate the mitre cuts for both inside and outside wall corners without having to measure the angle with a measuring tool and determine the precise degrees of the angles to be cut.

27 Claims, 24 Drawing Sheets

MITRE TOOL GUIDE

CROSS REFERENCE TO RELATED APPLICATIONS

This application is a continuation-in-part of U.S. Ser. No. 12/694,523, filed on Jan. 27, 2010, which is incorporated by reference in its entirety.

TECHNICAL FIELD

Disclosed is a tool for use with construction projects. The tool may be used in the field of carpentry to indicate accurate wall corner shapes for cutting mitres, such as baseboard molding, chair rail molding, crown molding, and the like.

BACKGROUND

Carpenters must frequently join materials at an angle in a manner commonly known as a mitre or coped joint. A mitre joint typically consists of two pieces of material that are joined at a corner, where each of the pieces is cut at a bisecting angle of the corner shape requiring the mitre joint. Mitre joints are used on molding surrounding doors, windows, floor bases, and stair cases as well as in other locations. As doors, windows, walls, and staircases are frequently not perfectly square due to natural imperfections, the actual angle required for the mitre joint must first be determined and then the materials cut to this angle.

Problems exist with current methods with regards to translating the measured mitre angle into a finish cut on the material to be joined. Imprecision between the scales of the device used for measuring the required mitre angle and of the cutting apparatus can result in inaccurate mitre cuts, resulting in mitre joints that are not mated properly. Also, human imprecision is added when the operator must read one scale on the measurement device and transfer the value to another scale on the cutting machine.

For many years, baseboard moldings, chair rail molding, cornice molding, etc. have been cut on a fixed mitre box. Some of the known fixed mitre boxes were manufactured from wood, steel, aluminum, or plastic. Fixed mitre boxes are virtually useless in making most angled mitre cuts accurately. In addition, the fixed mitre boxes only include precut mitre angle slots designed to cut 45, 60 and 90 degree angles. After several cuts through the same precut angle slot on a fixed mitre box, the angle slots become wider and wider until it is impossible to cut an accurate mitre.

More recently, circular adjustable angle mitre saws and radial arm saws have been used for cutting mitre angles. The latest generation of circular adjustable mitre saws also includes laser projection of the saw blade plane in attempt to guide the user in making more precise cuts. Prior to the use of the circular adjustable angle mitre saws, a pivoting manual saw was also used for cutting mitre angles.

Adjustable angle saws, both circular and manual, and radial arm saws still require that one first determine the angle of the corner in degrees and then set the mitre saw at the proper mitre cut line. If one does not accurately determine the angle of the corner in degrees, then the mitre cut will be incorrect and the piece of cut molding will be scrap material. Thereafter, the person making the mitre cuts must proceed to make further adjustments on the degree cut line with the hope that eventually an accurate mating joint will be cut.

It has always been an educated guess to determine the inside or outside angle of room corners in degrees, which is followed by a few trial and error cuts until one achieves an accurate mitre joint. The intersecting walls forming room corners should be 90 degrees, however, in many wall constructions this may not be entirely true. In fact, the room corners may often be up to 2 or 3 degrees off square. Consequently, if one cut perfect 45 degrees intersecting mitre cuts, the cut pieces of molding would not mate accurately.

As shown in FIG. 13, up to the present time, a very tedious and time consuming method used to determine a mitre cut without estimating or otherwise guessing at the angle of the corner is to use a 3" or 4" wide board placed flat on the floor against one wall and scribe a line on the floor away from the corner along the outside edge of the board. The same tedious method would then need to be performed on the other wall to scribe a line intersecting the scribe line from the first wall. The line drawn from the corner of the wall to the intersecting scribe lines on the floor is the mitre cut line that one would then need transfer to the saw deck using an adjustable square with or without an angle scale in degrees. A more tedious method of cutting 90 degree inside corner mitres was to trace the molding scroll pattern on one member and cut out the scroll pattern with a coping saw to mate with the other member. This method could only be used on 90 degree inside corners.

Because of the difficulty in judging the proper angles for the mitre cuts, one would be forced to make multiple cuts to arrive at accurate mating mitres, or simply caulk the inaccurate mitre to cover up a bad mitre joint.

The national average for carpenter wages is estimated to be about $30 per hour. Inaccurate mitre cuts result in increased labor costs and wasted material, which severely affect the profitability of a particular construction job for the carpenter. In addition, the wasted wood material also has a detrimental impact on the environment.

What is still needed in the art is a tool to accurately and easily determine the proper molding mitre cut plane without the need for measuring angles in degrees in order to achieve accurate and precise mitre cuts for both inside and outside corners.

DETAILED DESCRIPTION

Figure 1A:
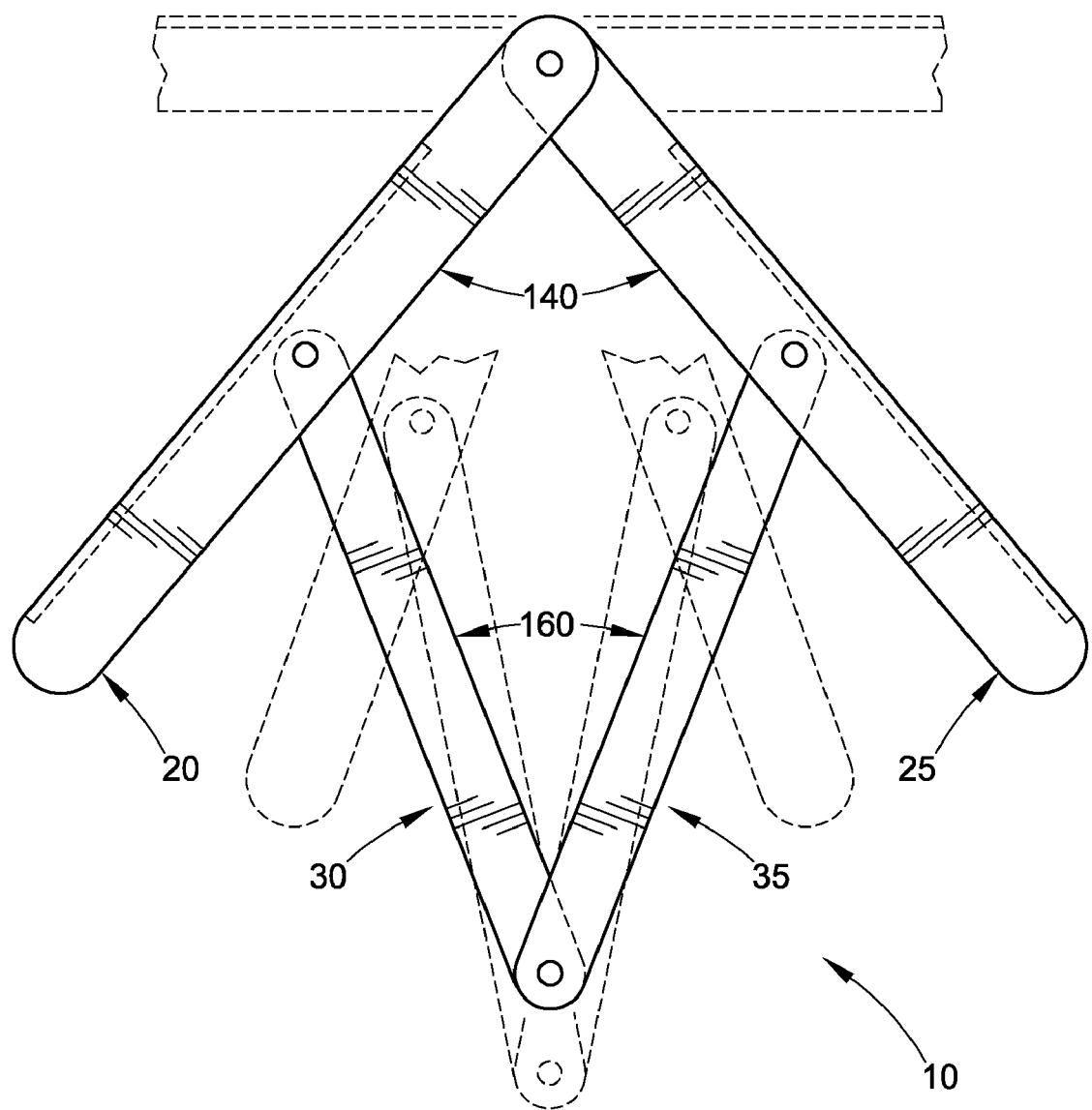
FIG. 1A is a plan view of an illustrative embodiment of the mitre tool arranged for indicating the shape of inside wall corners and subsequent mitre cut plane.
Figure 1B:
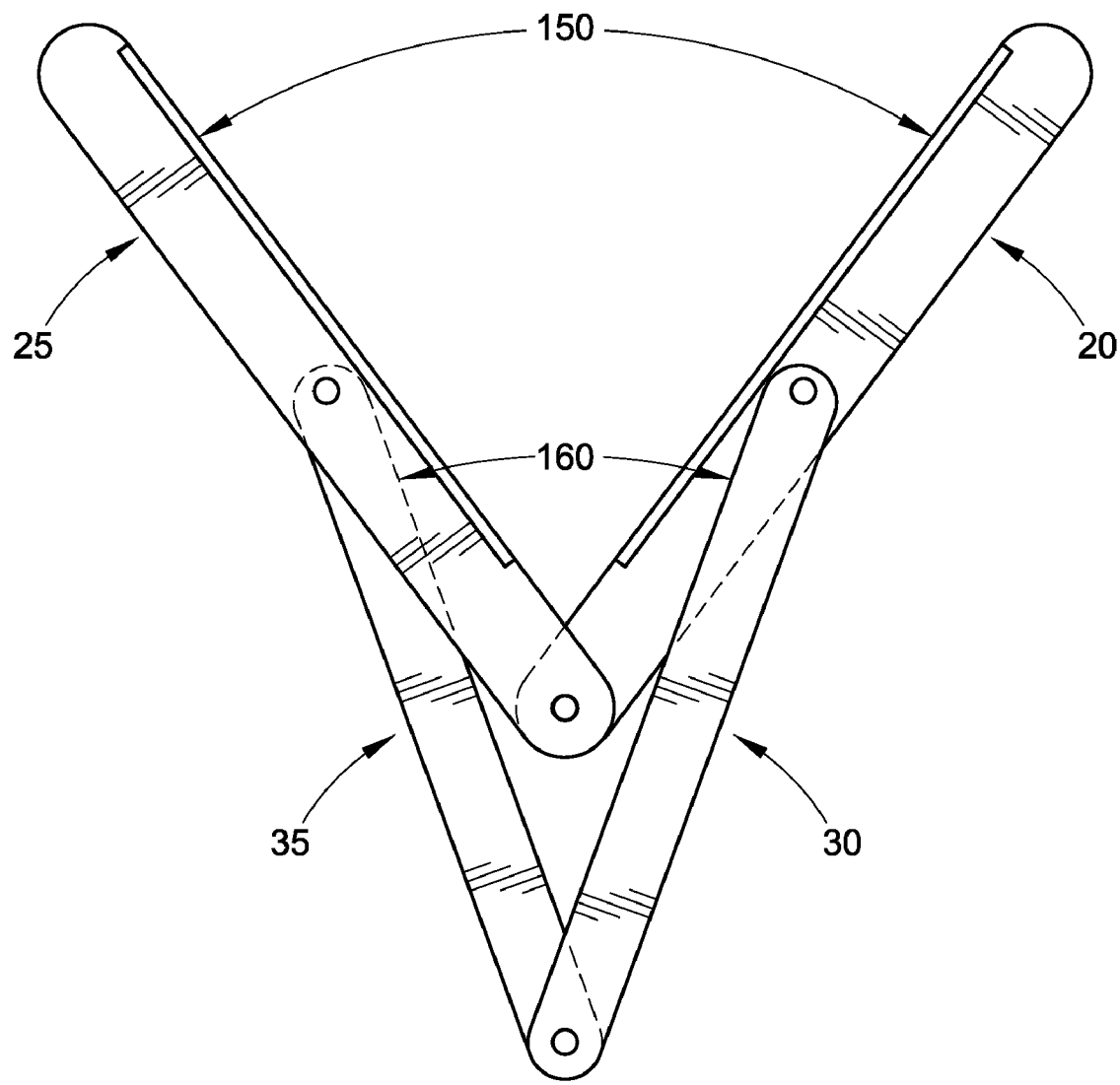
FIG. 1B is a plan view of an illustrative embodiment of the mitre tool arranged for indicating the shape of outside wall corners and subsequent mitre cut plane.

Provided is a useful tool to achieve accurate mitre cuts of baseboard moldings, chair rail moldings, wood or plaster cornice moldings for either inside or outside corner shapes of any given construction. The use of the tool and method to determine mitre cuts would greatly reduce cost of scrap material and lost labor resulting from multiple inaccurate cuts. This mitre tool can accomplish an accurate mitre cut for most acute and obtuse corner shapes and does not require measurement in degrees of the corner shape mitre to be cut.

The mitre tool and associated space adapter are mechanical tools that do not require any electronics to determine inside and outside wall corner shapes and to properly set the saw blade of a mitre saw to make an accurate and precise mitre cut.

The mitre tool broadly comprises a plurality of pivotably connected arms, at least one base member attached to at least one arm of said plurality of arms, and an elongated member slidably engaged with at least two said base members. The mitre tool includes at least locking mechanisms for releasably locking the arms in a desired position. When the pivoting arms of the tool are locked into position, the elongated slide arm bisects the corner shape formed by surfaces of certain of the arms. When the mitre tool is adjusted to fit the wall corner shape, the slide arm is held in a north-south position by the slide arm guides at pivot points. Thus, the mitre tool can accurately determine the shape of wall corner shapes based on a well known geometric principle in bisection of any angle without knowing the angle in degrees using a mechanical measuring device, such as a compass.

The mitre tool can determine the bisection of any corner shape. This bisection, indicated by the slide arm member is the cut line that is transferred to the mitre saw deck and aligned with the saw blade plane. The mitre tool can mirror all wall corner shapes and indicate the mitre cut line automatically for most corner shapes in any residential or commercial construction.

According to certain illustrative embodiments, the plurality of pivotably connected arms comprises a first set and a second set of pivotably attached arms. Without limitation, the first set of arms is pivotably engaged with a first base member and the second set of arms is pivotably engaged with a second base member. The first set of arms and the second sets of arms are also pivotably attached to each other. The slide arm is slidably engaged with the first and second base members.

According to certain embodiments, the arms of the first set of arms are substantially planar. These arms may comprise a number of non-limiting cross sectional shapes that will permit pivoting of the arms at the pivot point(s) to effect the expansion and contraction function of the tool.

The arms of the second set of arms may comprise a planar portion and a bend portion. The bend portion of the arms of the second set of arms may comprise a substantially 90 degree bend along at least a portion of the longitudinal axis of said arms.

According to certain illustrative embodiments, first ends of each of the arms of the first set of arms are pivotably engaged with a first base member and the second ends of each of the arms of the first set of arms are pivotably engaged to one of the arms of the second set of arms. The first ends of each of the arms of the second set of arms are pivotably engaged with a second base member and each of the arms of the second set of arms are pivotably engaged to one of the arms of the first set of arms. According certain embodiments, the mid-portion between opposite ends of each of the arms of the second set of arms is pivotably engaged to an end of one of the arms of the first set of arms.

According to certain embodiments, the first set of arms comprises two arms. According to other embodiments, the second set of arms comprises two arms. However, many embodiments of the tool include both the first set of arms and the second set of arms each comprises two arms.

At least one of the first and second base members of the tool are translatable along at least a portion of the longitudinal axis of the elongated member. According to certain embodiments, both of the first and second base members are translatable along at least a portion of the length of the elongated member.

According to certain illustrative embodiments, elongated slide arm of the tool may include at least one horizontal flange portion and a upstanding fin portion. The upstanding fin portion comprises a cut line guide for the saw blade of any table saw. The slide arm is engaged with the slide arm guide assemblies. The slide arm is engaged to the slide arm guide assemblies in a manner such that the slide arm is free to translate between these components. The slide arm may further include a stop for retaining the horizontal flange portion of the slide arm between slide arm guides of the base member assemblies.

According to further illustrative embodiments, the elongated slide arm of the mitre tool may comprise an elongated and substantially planar bar. The elongated and substantially planar bar further includes a slot extending substantially along the entire longitudinal axis of the elongated bar. The longitudinally extending slot communicates though the entire thickness of the elongated and substantially planar slide arm. The elongated and slotted slide arm is not fixedly attached to any of the other pivotable arms of the mitre tool. Consequently, the elongated and slotted arm can slide in the direction of its longitudinal axis to points beyond the pivot point at which the ends of the first set of pivotably attached arms are pivotably attached to one another, and the pivot point at which the ends of the second set of pivotably attached arms are attached to one another.

The mitre tool includes two locking mechanisms for releasably locking the first set of arms and second set of arms in a desired position. As described above, the slide arm bisects the angle formed by surfaces of the arms of the second set of arms when the first set of arms and the second set of arms are locked in the desired position.

According to the embodiments of the mitre tool that include the elongated and slotted slide arm, the first set of arms and the second set of arms are locked into a desired position by lockable guide members that are engaged with the slotted slide arm and the ends of the first set of pivotably attached arms. A first lockable guide member is engaged with the elongated and slotted slide arm and the first set of arms. Likewise, a second lockable guide member is engaged with the elongated and slotted slide arm and the second set of arms. According to this construction of the mitre tool, the connections between the first set of arms and the second set of arms do not require additional locking mechanisms to maintain the arms of the mitre tool in the desired position for bisecting an angle. The first set of arms and the second set of arms may be connected by rivets, pins, rods, dowels, shafts and the like which permit free rotation of the arms. However, if desired, alternative embodiments of the mitre tool may include further locking mechanisms for attached the first set of arms to the second set of arms to one another.

Without limitation, the lockable guide members may comprise a threaded bolt or stud in combination with an internally threaded cylinder, such as an internally threaded sleeve nut. A washer, such as a polymeric washer may surround a portion of the external diameter of the sleeve nut. Without limitation, and only by way of illustration, the polymeric washer may comprise a nylon washer. The internally threaded cylinder is passed through bore holes formed in the arms of the mitre tool. The threaded bolt or stud is threaded into the cylinder to secure the arms of the mitre tool in proper position for bisecting any angle.

The mitre tool may be used to indicate outside wall corner shapes for cutting with a cutting machine. In order to accurately cut outside corner shapes, a space adapter must be engaged with the mitre tool. The space adapter includes a plurality of pivotably connected spacer arms. Without limitation, the space adapter comprises first and second sets of pivotably connected space adapter arms. Each of first and second sets of pivotably connected space adapter arms may comprise two arms. For embodiments where the space adapter includes two sets of arms, the first ends of the first set of space adapter arms are attached to a first space adapter arm of the second set of space adapter arms and the second ends of the first set of space adapter arms are attached to a second space adapter arm of the second set of space adapter arms. One arm of the second set of pivotably engaged arms is releasably connected to an arm of the space adapter.

In certain embodiments, the mitre tool is comprised of four arms or linkages that form two unique triangle shapes that are joined at the common base of each triangle with a slide arm member that is commonly engaged to both triangles. There are four pivot points, all bolted at two points along the east-west line with suitable mechanical fasteners. Two pivot points on the north-south line in the horizontal plane have slide arm guide assemblies also bolted at or near each of the two pivot point. These two slide arm guides are used to guide and hold the slide arm which functions as the cut line indicator of all corner shape mitres.

The method of using the mitre tool utilizes a geometric principle for bisecting any acute or obtuse corner wall shapes without requiring measurement devices to obtain the specific angles in degrees. The mitre tool eliminates the requirement to calculate angles for cutting mitre joints. By using the mitre tool, there is no need ever to determine the angle in degrees.

The mitre tool may be manufactured from metals, metal alloys, plastics, composite materials, or wood. According to certain embodiments, the mitre tool maybe manufactured from a rigid plastic material. The use of a plastic material is of a benefit being lightweight and less expensive to manufacture and ship.

The mitre tool is placed into or around a wall corner and the arms of the tool are made to come into contact with the wall surfaces comprising the corner. To obtain the shape of the corner, the arms of the tool are locked into position at pivot points 31 and 32. When the mitre tool is secured in this position, it can then be used to scribe the miter angle onto the material to be cut, onto a work surface, or be used as a guide to set the cutting position of the saw blade of a mitre saw.

The mitre tool may be used the mitre cut for most wall corner shapes. The mitre tool may also be used to determine mitre cuts for in cabinet and furniture trim moldings. The mitre tool can be used indicate mitre cuts for cutting plaster cornice moldings as well as wood and composite molding materials.

According to certain illustrative embodiments, the mitre tool comprises a slide arm that includes a stop for retaining the slide arm in position between spaced-apart slide arm guides.

According to other illustrative embodiments, the mitre tool comprises a slide arm that is held and directed by two slide arm guides. The slide arm guides guide the slide arm, without angular deviation, in bisecting the corner shape determined by the mitre tool.

The mitre tool will now be further described in connection with certain illustrative embodiments depicted in the drawing Figures. It should be noted that the mitre tool should not be limited to the illustrative embodiments depicted by the Figures.

As shown in FIGS. 1A-1C, 2A-2C, 4A-4E, 5A-5D, 6 and 7, the mitre tool 10 comprises an elongated slide arm 15, four elongated pivotable arms 20, 25, 30, and 35, two slide arm guide assemblies 6, 7 and two bases 18. The slide arm guides are shown as an assembly of angled guide portions that are attached to a base member. However, it should be noted that the slide arm guide assembly may be provided as a single piece, such as a single piece of molded plastic. The slide arms, pivotable arms, and slide arm guides may be manufactured from metals, metal alloys, plastic, wood, or composite materials of a rigid plastic, steel or wood materials.

Figure 2A:
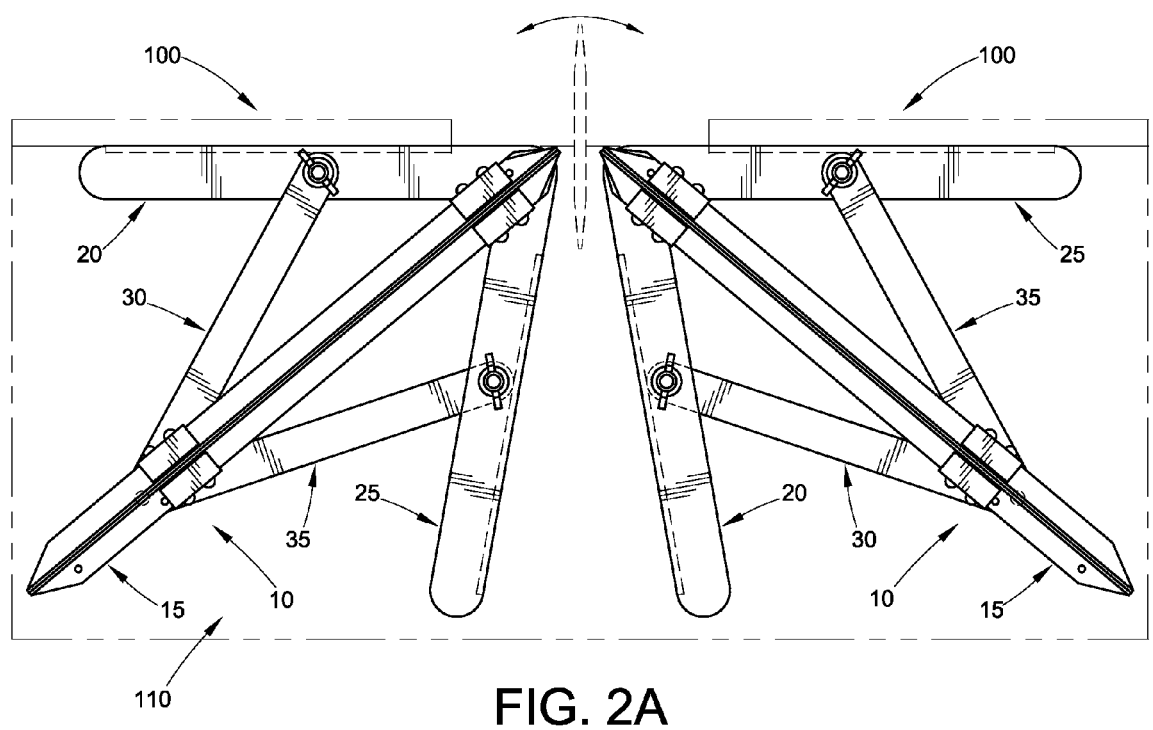
FIG. 2A is a plan view of an illustrative embodiment of the mitre tool at various positions on a saw deck for making left hand and right hand inside wall corner mitre cuts.
Figure 2B:
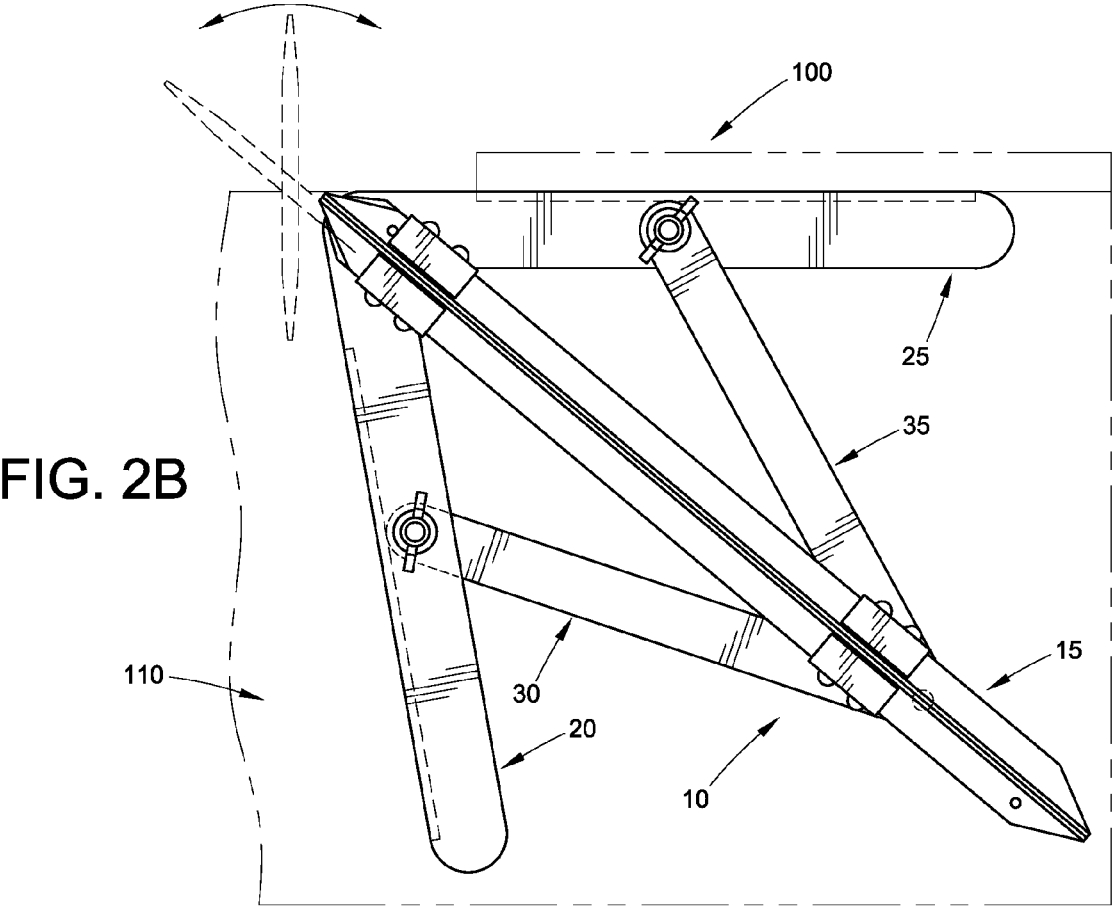
FIG. 2B is a plan view of an illustrative embodiment of the mitre tool positioned on a saw deck for making right hand inside wall corner mitre cuts.
Figure 2C:
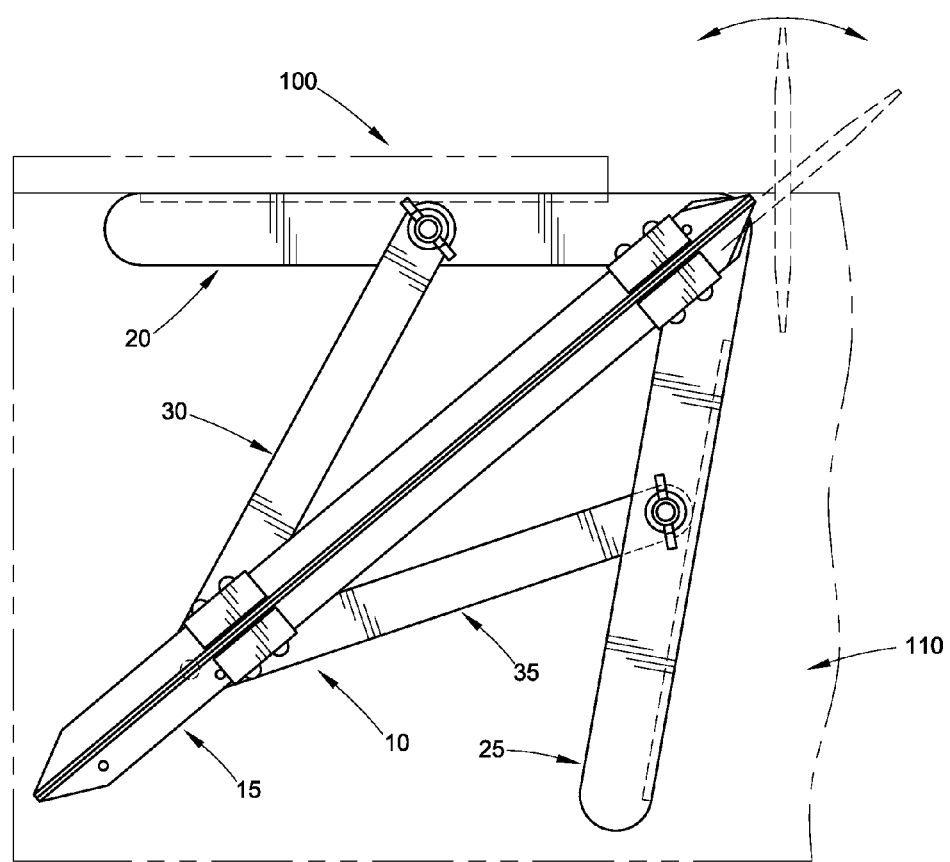
FIG. 2C is a plan view of an illustrative embodiment of the mitre tool positioned on a saw deck for making left hand inside wall corner mitre cuts.
Figure 6:
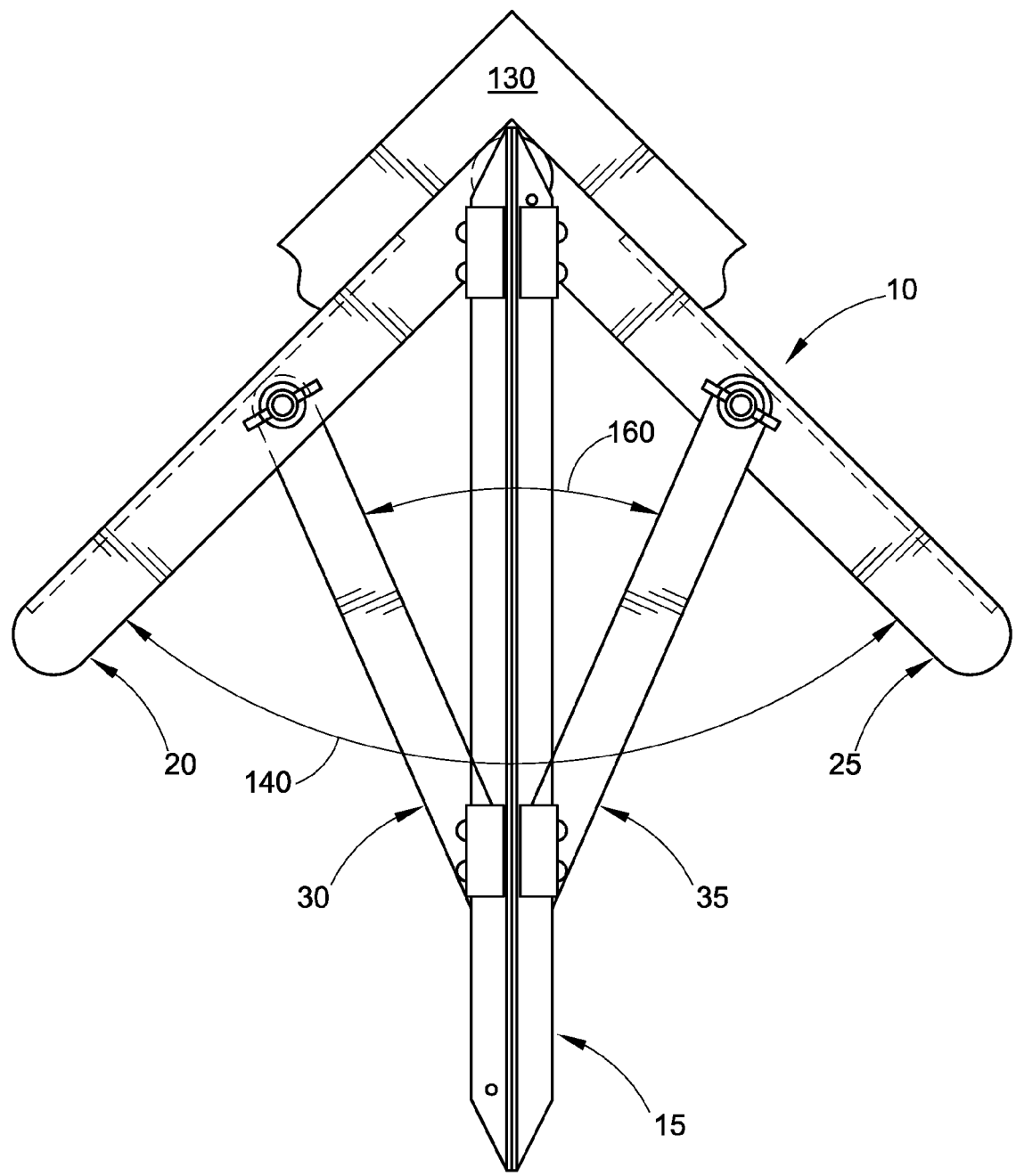
FIG. 6 is a plan view showing the position of an illustrative embodiment of the mitre tool engaged with an inside wall corner.
Figure 7:
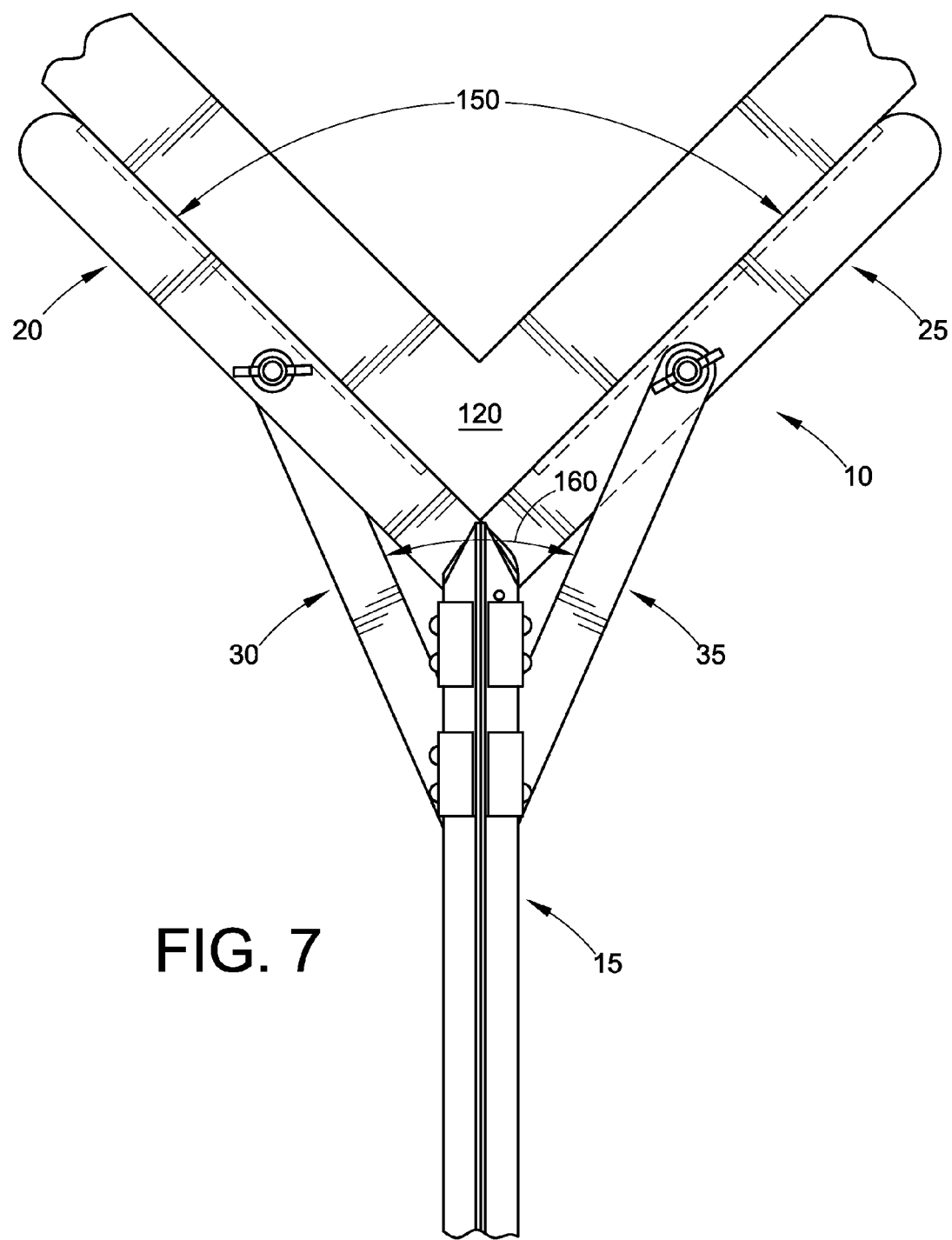
FIG. 7 is a plan view showing the position of an illustrative embodiment of the mitre tool engaged with an outside wall corner.

Arm 20 includes opposite first 41 and second 21 ends. Likewise, arm 25 includes opposite first 43 and second 22 ends. The second ends 21 and 22 of arms 20 and 25 are pivotably secured to one another and the underside of base 18 by a mechanical fastener. Without limitation, mechanical fasteners may include a bolt, screw, hinge, rivet, tack, or dowel. The arms 20 and 25 comprise vertical portions 40 and 42 that are joined to the horizontal portions 44 and 46 of the arms 20 and 25 at substantially right angles. The vertical portions 40 and 42 include outer abutment surfaces 47 and 48 for contacting the surfaces of wall corners as shown in FIGS. 6 and 7 and for contacting the vertical fence 100 of a table saw 110 as shown in FIGS. 2A-2C.

Figure 3A:
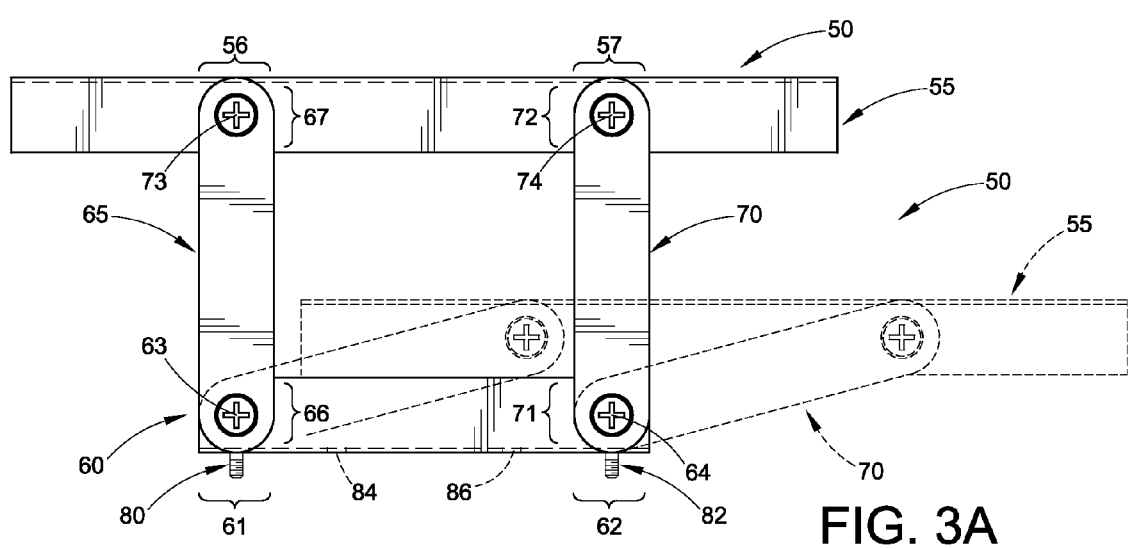
FIG. 3A is a plan view of the space adapter for the mitre tool and is used for positioning the mitre tool on the saw deck when cutting outside wall corner shapes and is attached to one of the pivotable arms of the mitre tool.

The vertical portions 40 and 42 of arms 20 and 25 also include inner abutment surfaces 96 and 97 for contacting the abutment surface 94 of the separately attached mitre tool space adapter 50 as shown in FIG. 3A. The vertical portions 40 and 42 comprise apertures, such as holes 51, 52 and 53, 54, respectively, that provide for removably securing the mitre tool 10 to the space adapter 50.

Figure 1C:
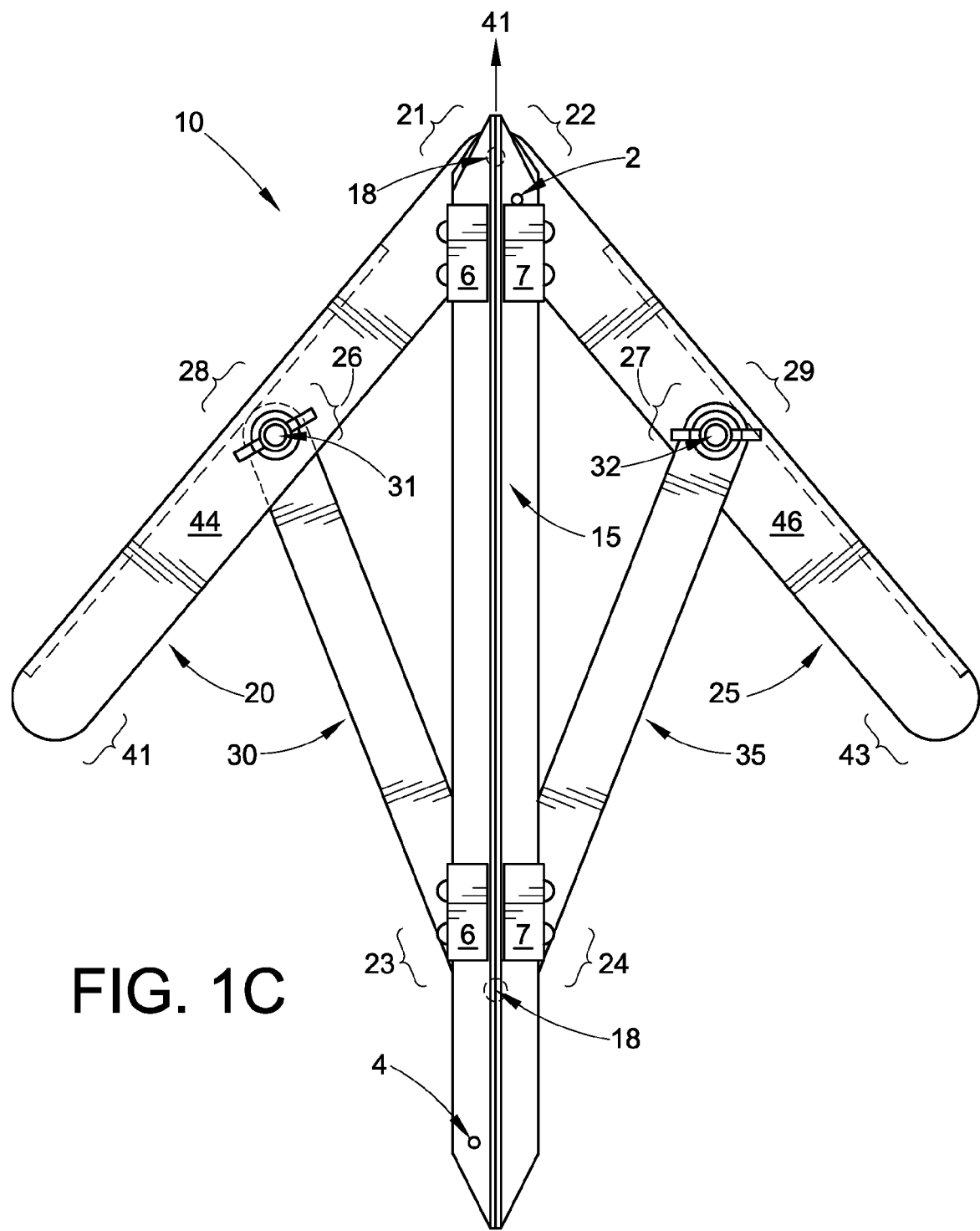
FIG. 1C is another plan view of an illustrative embodiment of the mitre tool in another position and showing a slide arm held by guides mounted at pivot points.

As shown in FIGS. 1A and 1C, the proximal portions 23 and 24 of arms 30 and 35 are pivotably secured to one another and the underside of base 18 by a mechanical fastener 33. The mechanical fasteners used to secure arms 30 and 35 to base 18 may be the same as the fasteners used to secure arms 20 and 25 to base 18. The distal portions 26 and 27 of arms 30 and 35 are pivotably secured to arms 20 and 25 by fasteners 31 and 32 at pivot points 28 and 29. The mechanical fasteners used to secure arms 30 and 35 to arms 20 and 25 may be the same as the fasteners used to secure arms 20, 25 and 30, 35 to bases 18. According to the illustrative embodiment shown in FIGS. 1A and 1C, the mechanical fastener used comprises an assembly of a bolt, washer and wing nut.

Figure 1D:
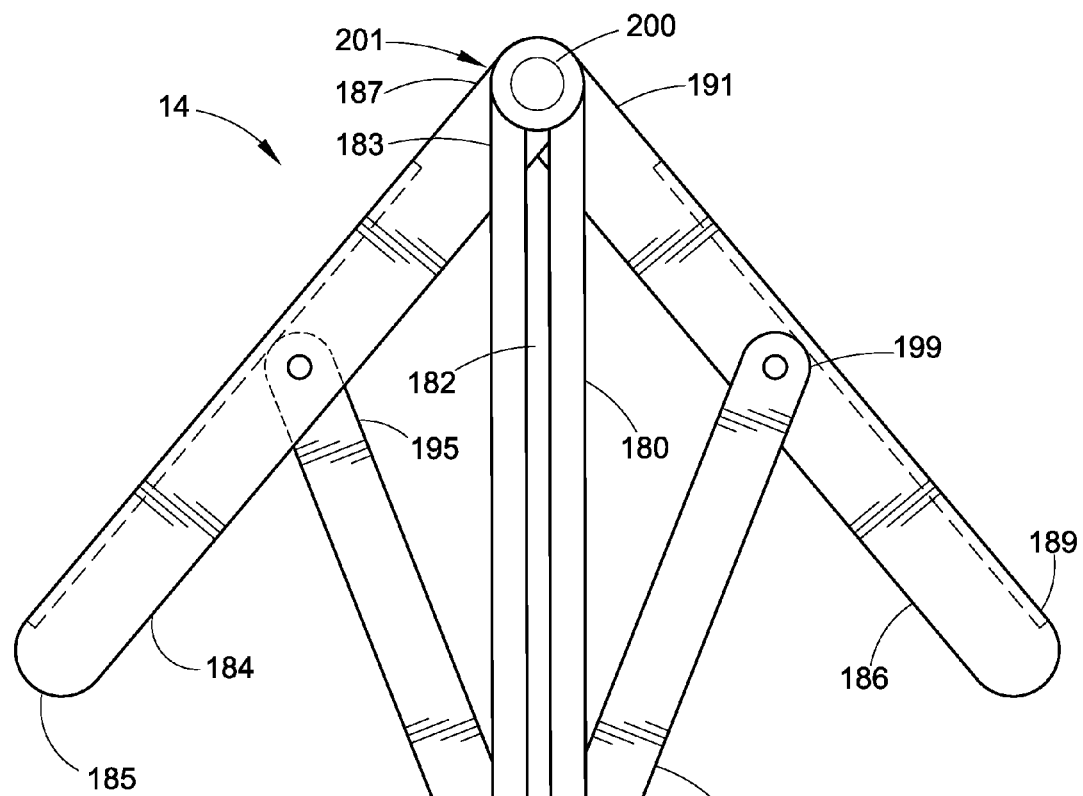
FIG. 1D is a plan view of another illustrative embodiment of the mitre tool showing of an alternative embodiment of the slide arm.

FIG. 1D shows a top plan view of another illustrative embodiment of the mitre tool 10 having an elongated and slotted slide arm 180. Elongated slide arm 180 includes an elongated slot 182. Elongated slot 182 extends substantially along the entire longitudinal axis of elongated arm 180. That is, the slot 182 extends along almost the entire length of the elongated slide arm 180. In the embodiment shown in FIG. 1D, the elongated slot 182 of the slide arm 180 extends through the entire thickness of the arm 180. Four elongated pivotable arms 184, 186, 188, and 190, and two lockable slide arm guides 200, 210 are also depicted in FIG. 1D.

Still referring to FIG. 1D, arm 184 includes opposite first 185 and second 187 ends. Likewise, arm 186 includes opposite first 189 and second 191 ends. The second ends 187 and 191 of arms 184 and 186 are pivotably secured to one another and the underside of slide arm 180 with a lockable slide guide 200 at pivot point 201. Arm 188 includes opposite first 193 and second 195 ends. Likewise, arm 190 includes opposite first 197 and second 199 ends. The ends 193 of arm 188 and end 197 of arm 190 are pivotably secured to one another and the underside of arm 180 by a second lockable guide member 210 at pivot point 202.

Figure 1E:
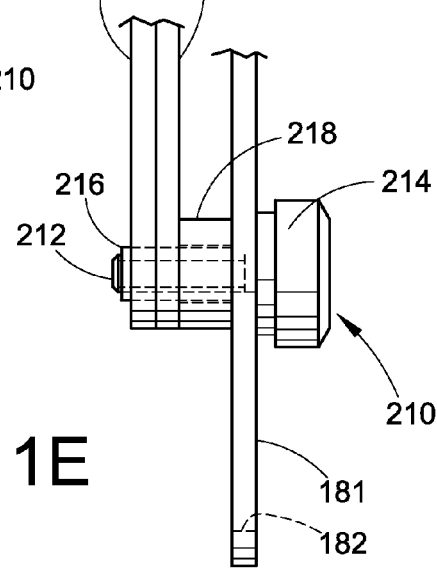
FIG. 1E is a fragmentary side view of one illustrative slide arm guide in combination with a slotted slide arm.

As shown in FIG. 1E, without limitation, the lockable guides 200, 210 may comprise a threaded stud 212 with a knob 214 attached to one end of the threaded stud 212. The threaded stud 212 is threaded into a sleeve nut 216. A washer 218 is positioned between a surface of the slide arm 180 and a surface of pivotable arm 190. The washer 218 is positioned in a manner to surround a portion of the sleeve nut 216. While FIG. 1E depicts an embodiment of the locking slide guides 200, 210 of the mitre tool 10 using a threaded stud and sleeve nut, it should be noted that any suitable locking mechanism may be employed so long as the locking mechanism can work in conjunction with the slotted slide arm 180 to provide guidance for the slidable arm 180 and is able to lock the arms 184, 186, 188, 190 of the mitre tool 10 in a desired position when bisecting an angle.

Figure 4A:
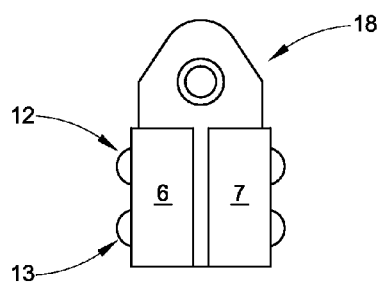
FIG. 4A is a top view of a portion of the slide arm and slide arm guides of an illustrative embodiment of the mitre tool.
Figure 4B:
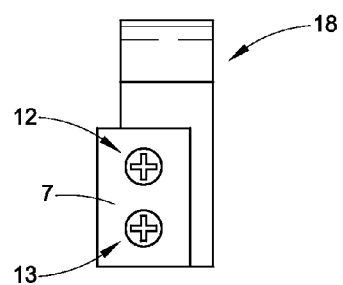
FIG. 4B is a side view of the slide arm guide assembly of an illustrative embodiment of the mitre tool.
Figure 4C:
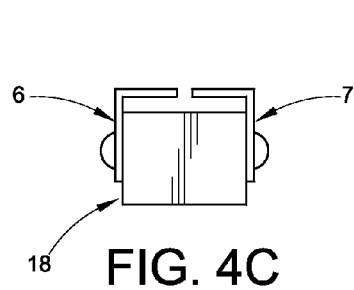
FIG. 4C is a side view of the slide arm guide assembly of an illustrative embodiment of the mitre tool.
Figure 4D:
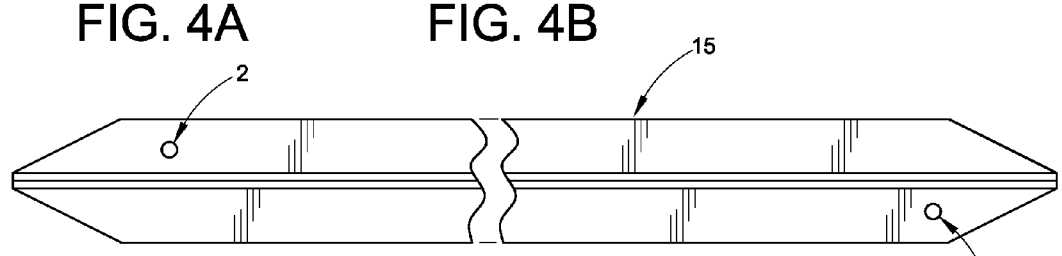
FIG. 4D is a plan view of the slide arm of an illustrative embodiment of the mitre tool.
Figure 4E:
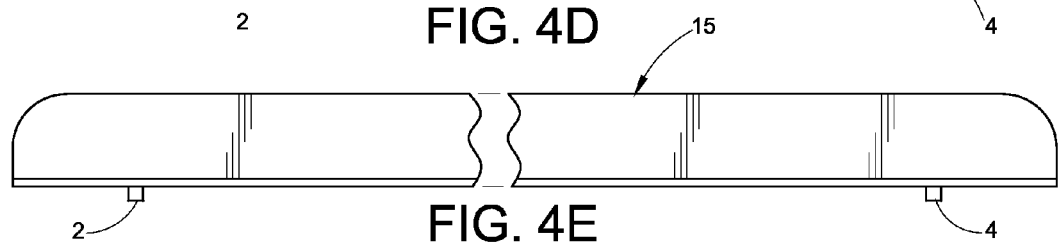
FIG. 4E is a side view of the slide arm of an illustrative embodiment of the mitre tool.
Figure 4F:
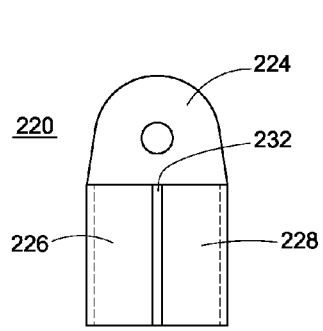
FIG. 4F is a top view of a portion of the slide arm and slide arm guides of another illustrative embodiment of the mitre tool.
Figure 4G:
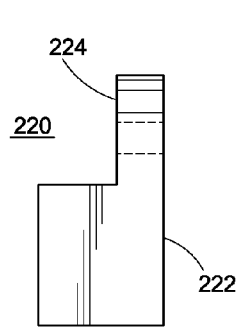
FIG. 4G is a side view of the slide arm guide of another illustrative embodiment of the mitre tool.
Figure 4H:
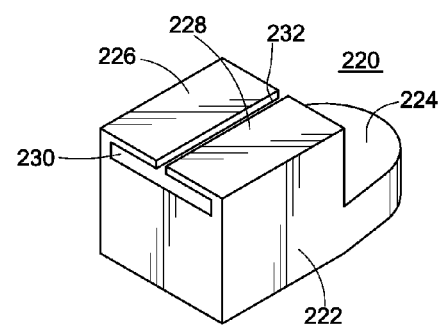
FIG. 4H is a side view of the slide arm guide of an illustrative embodiment of the mitre tool.

As shown in FIGS. 4A-4C, according to certain embodiments, the two slide arm guide 6, 7 are mounted to the bases 18. In the illustrative embodiment, guides 6, 7 are secured to the bases 18 by mechanical fasteners. For example, one pair of fasteners 12, 13 may be used to secure the slide arm guides 6, 7 to the bases 18. The elongated slide arm 15 engages two pairs of slide arm guides 6, 7 in a slidable engagement. The slide arm 15 includes a pair of stops 2 and 4. It should be noted that the slide arm 15 may be provided as separate pieces that are attached to one another or may be provided as a single integral tee piece. According to FIGS. 4A-4C, the slide arm guides are shown as an assembly of angled guide portions that are attached to a base member. As shown in FIGS. 4F-4H, it should be noted that the slide arm guides may be provided as a single piece, such as a single piece of molded plastic.

As shown in FIGS. 4F-4H, the slide guide 220 includes a single internal piece, such as an integrally molded piece. Slide arm guide 220 may include a base portion 222 with a tab portion 224. Base portion 222 further includes tab portions 226, 228 on an upper portion of the base portion 222. Tabs 226, 228 define channels 230, 232 for accepting the horizontal flange portion and upstanding fin portion of one embodiment of the elongated slide arm of FIGS. 4D and 4E.

Figure 3B:
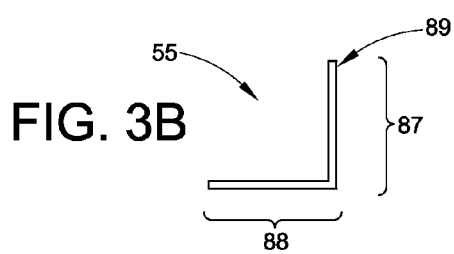
FIG. 3B is an end view of an arm of the space adapter shown in FIG. 3A.
Figure 3C:
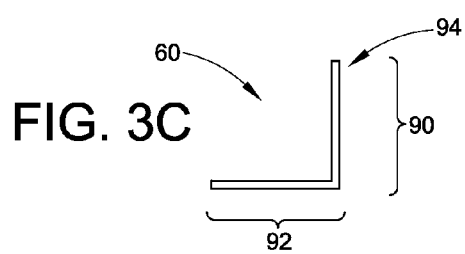
FIG. 3C is an end view of an arm of the space adapter shown in FIG. 3A.
Figure 4I:
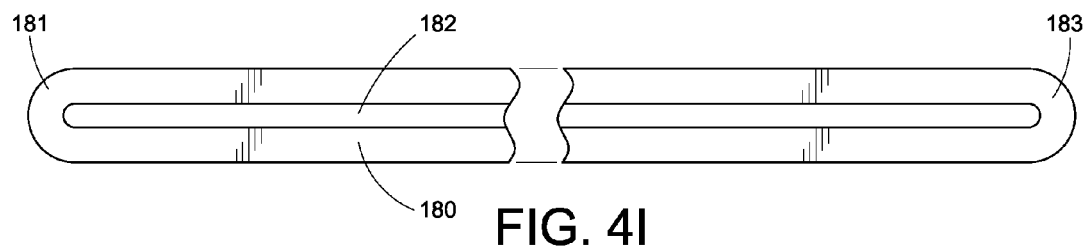
FIG. 4I is a plan view of the slide arm of another illustrative embodiment of the mitre tool.
Figure 5A:
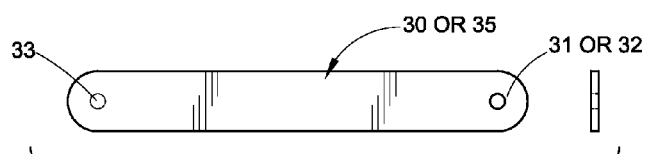
FIG. 5A shows top plan view of the pivotable arms of the mitre tool.
Figure 5B:
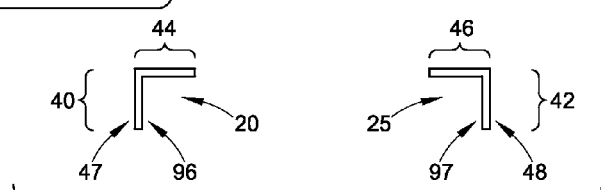
FIG. 5B shows end views of the pivotable arms 20 and 25 of the mitre tool.
Figure 5C:
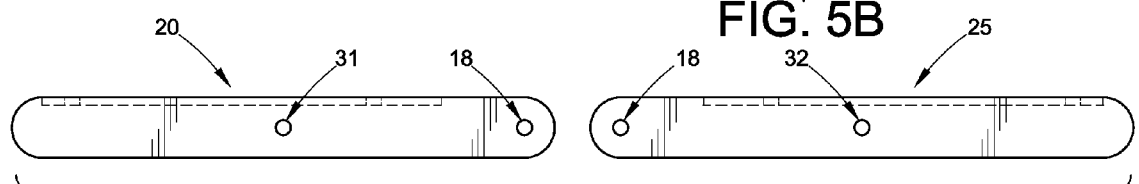
FIG. 5C shows top plan view of the pivotable arms of the mitre tool.
Figure 5D:
FIG. 5D shows side view of the pivotable arms of the mitre tool.
Figure 10:
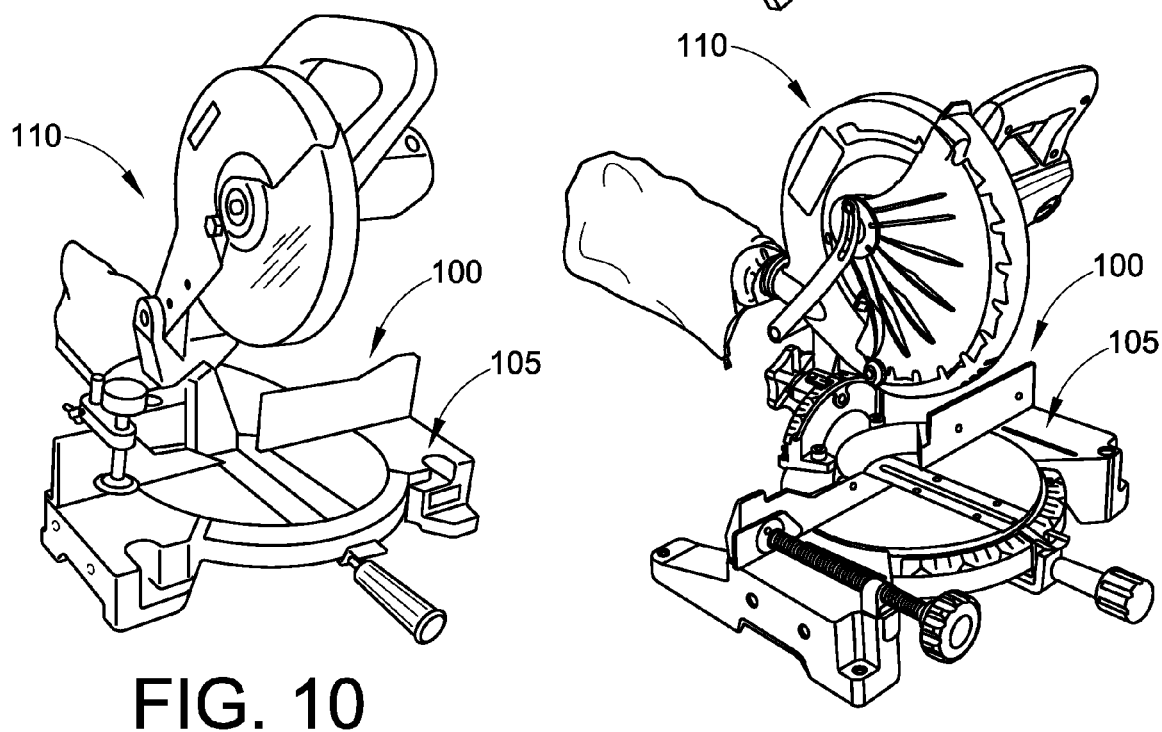
Figure 11:
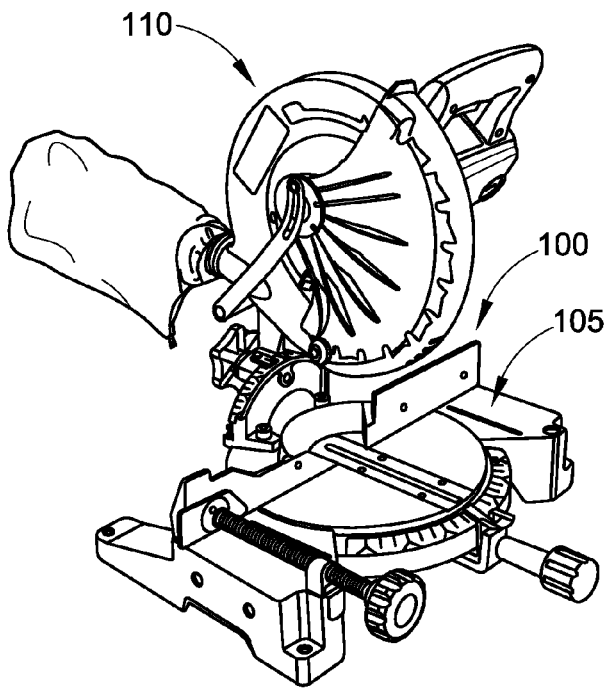

FIG. 4I depicts an illustrative embodiment of the slotted slide arm 180. Slide arm 180 includes opposite first 181 and second 183 ends. Opposite ends 181, 183 may be rounded or otherwise tapered. Slide arm 180 includes an elongated slot 182 that extends along at least a portion of the longitudinal axis of the arm 180. In the embodiment shown in FIG. 4I, elongated slot 182 extends substantially along the entire longitudinal axis of slidable arm 180. communicates As shown in FIGS. 3A, 3B and 3C, the mitre tool space adapter 50 comprises two spaced-apart elongated arms 55 and 60. Two further elongated arms 65 and 70 extend between and connect bars 55 and 60. As shown in FIG. 3B, the arm 55 comprises a vertical portion 87 joined to the horizontal portion 88 of the arm 55 at a substantially right angle. The vertical portion 87 includes an abutment surface 89 for contacting the vertical fence 100 of a table saw 110 as shown in FIGS. 10 and 11.

As shown in FIG. 3C, the arm 60 comprises a vertical portion 90 joined to the horizontal portion 92 of the arm 60 at a substantially right angle. The vertical portion 90 includes an abutment surface 94 for contacting the abutment surfaces 47 and 48 of the mitre tool 10. The vertical portion 90 provides for removably securing the space adapter 50 to the mitre tool 10 when setting the mitre saw blade in the same plane as the slide arm plane for outside corners.

The proximal portions 66 and 71 of bars 65 and 70 are pivotably secured to the ends 61 and 62 of arm 60 by suitable mechanical fasteners 63 and 64. The distal portions 67 and 72 of arms 65 and 70 are pivotably secured to the mid-portions 56 and 57 of arm 55 by fasteners 73 and 74.

As shown in FIG. 3C, the arm 60 is provided with a pair of notches 84 and 86 to provide clearance for 31 and 32 respectively when the space adapter 50 is attached to either arm 20 or 25. The arm 60 is further provided with a pair of fasteners 80 and 82 for firmly securing the arm 60 to arms 20 and 25 to allow the mitre tool 10 to be positioned against a fence 100 of a table saw 110.

Figure 3D:
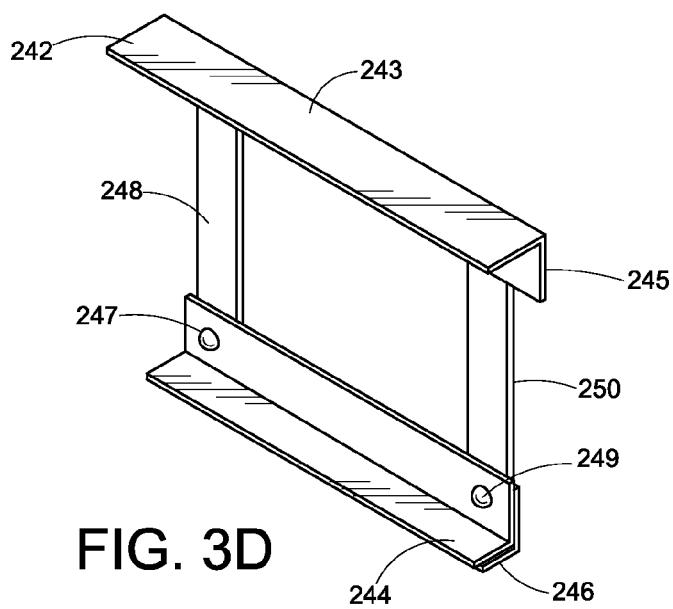
FIG. 3D is a perspective view of another illustrative embodiment of the space adapter.
Figure 3E:
FIG. 3E is a side view of the illustrative embodiment of the space adapter.
Figure 3F:
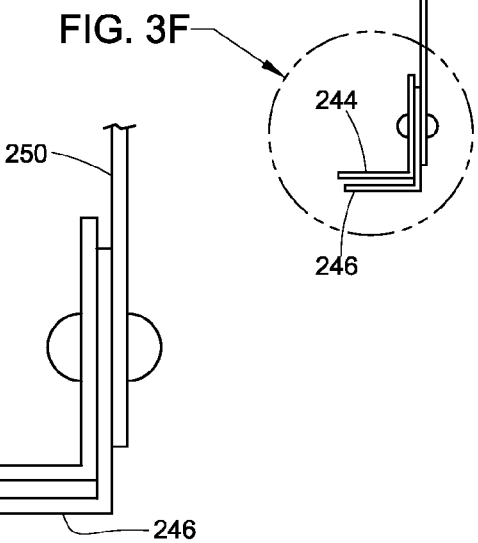
FIG. 3F is a fragmentary view of a portion of the illustrative embodiment of the spacer adapter shown in FIGS. 3D and 3E.

Another illustrative embodiment of the space adapter is shown in FIGS. 3D-3F. Referring to FIGS. 3D-3F, space adapter 240 comprises elongated arm 242 that is spaced-apart from a staggered set of two elongated arms 244, 246. Two further elongated arms 248 and 250 extend between and connect arms 242, 244, 246. As shown in FIGS. 3D and 3E, the arm 242 comprises a vertical portion 243 joined to the horizontal portion 245 of the arm 242 at a substantially right angle. The vertical portion 243 includes an abutment surface for contacting the vertical fence of a table saw.

In use, the mitre tool 10 is placed into or around a corner as shown in FIGS. 6 and 7 respectively and the abutment surfaces 47 and 48 of the arms 20 and 25 are made to contact the surfaces comprising the corner in order to determine the mitre or bisecting angle. As shown in FIGS. 1A, 1B, 6 and 7, the tool 10 is capable of manipulation such that pivotably rotatable movement around fasteners 31, 32 allows arms 20 and 25 to move toward or away from the elongated slide arm 15 (i.e., the wall corner shapes 140 and 150 decreases or increases respectively) when determining inside and outside corner shapes (whether the corners have acute or obtuse angles), while at the same time allows the slide arm 15 to remain in a north-south position bisecting the corner shape moving through two slide arm guides 6, 7 with which it is engaged. Similarly as shown in FIGS. 1A, 1B, 1C, 6 and 7, manipulation of the tool 10 results in arms 30 and 35 to move toward or away from the elongated slide arm 15 (i.e., the wall corner shape 160 decreases or increases respectively) when determining inside and outside corner shapes (whether the corners have acute or obtuse angles), while at the same time allows the slide arm 15 to move through two slide arm guides 6, 7 with which it is engaged.

The arms 20 and 25 are made to come into contact with the walls of a corner. Once the abutment surfaces 40 and 42 of arms 20 and 25 are brought into contact with walls, then fasteners 31 and 32 located at the east-west pivots are tightened to set and lock the arms 20, 25, 30 and 35 in position.

Figure 9:
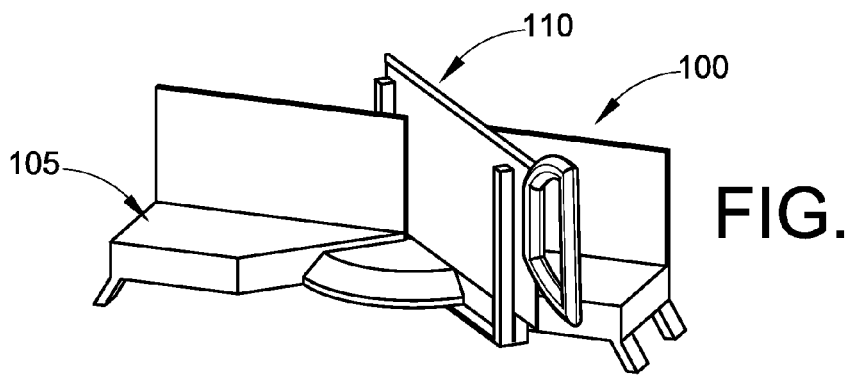
FIGS. 9-12 show examples of certain mitre table saw apparatuses for use with the mitre tool.
Figure 12:
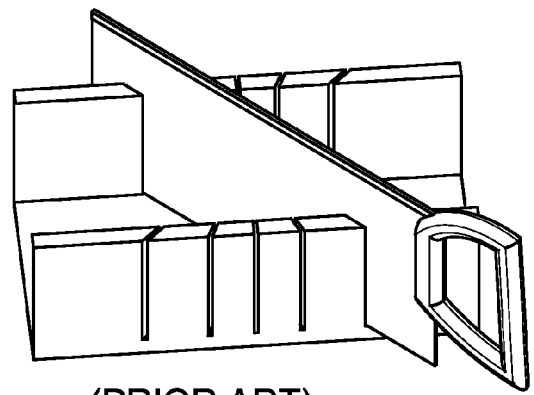
Figure 13:
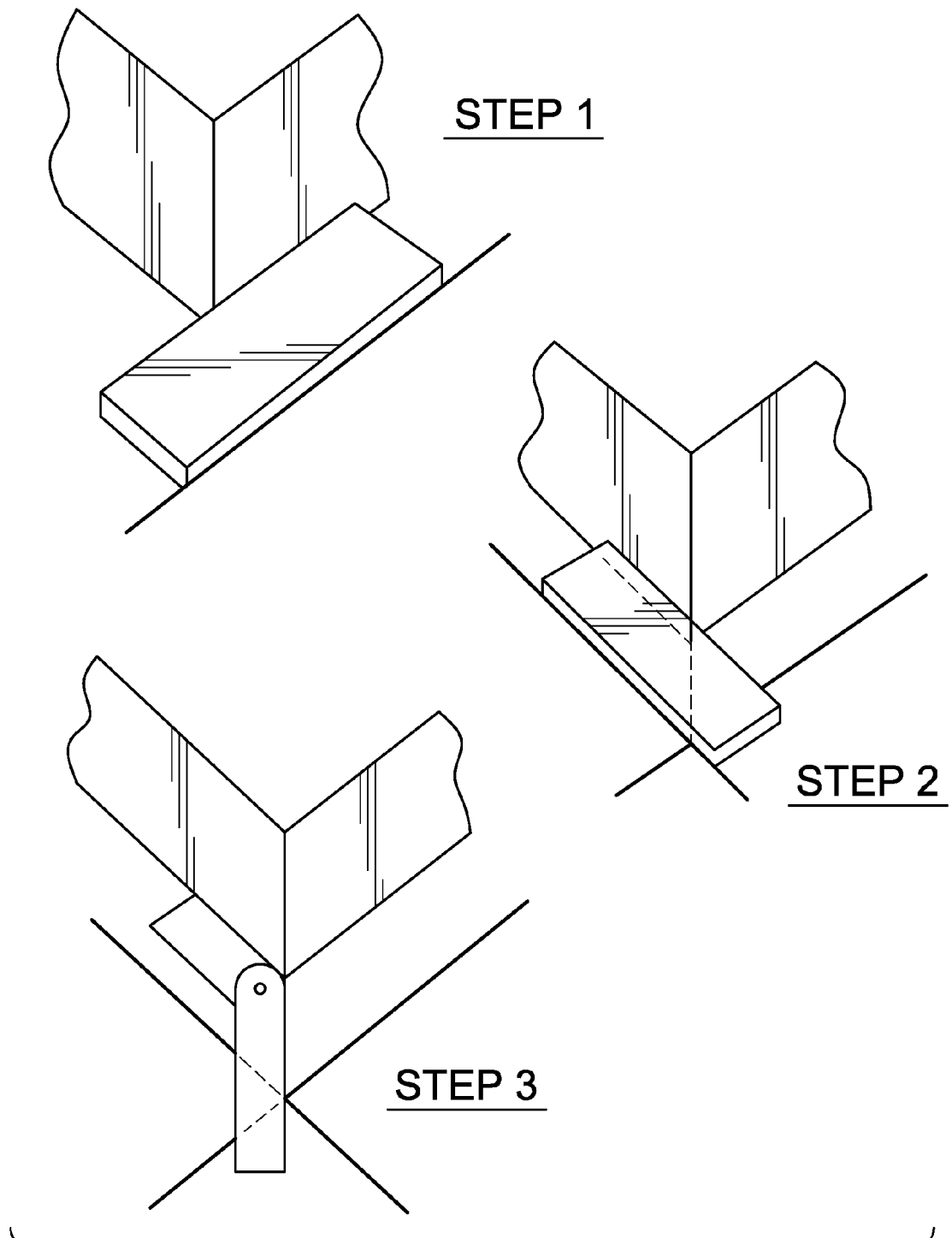
FIG. 13 shows a prior art method for determining the proper mitre cut angles.

The mitre tool 10 is then removed from the corner and placed onto the saw deck of a suitable saw, such as an adjustable circular mitre saw as shown in FIGS. 10 and 11 or a manually adjusted mitre saw as shown in FIGS. 9 and 12. The mitre tool 10 is positioned on the saw deck 105 with either one of the outer abutment surfaces 47 and 48 of arms 20 and 25 respectively contacting the mitre saw vertical fence guide 100 for inside corners or abutment surface 89 of the space adapter 50 contacting the mitre saw vertical fence guide 100. Subsequently, the mitre saw blade is rotated to a position such that the blade and slide arm 15 are aligned in the same plane. Once the saw blade is moved into proper cutting position, then the tool 10 is removed from the saw deck. After the mitre tool 10 is removed, the molding to be cut is positioned against the vertical fence 100 for either right or left hand cuts and the molding is cut with the saw blade.

To specifically create a mitre joint at an inside corner 130 as shown in FIG. 6, the user first ensures that the tool 10 is in a position such that stop 2 of the one end of slide arm 15 is in contact with slide arm guides 6 and 7 as shown in FIGS. 4B and 4C. Stop 4 of the opposite end of slide arm 15 is located closer to, but not in contact with, slide arm guides 6, 7. Next, the user positions the abutment surfaces 47 and 48 of tool 10 against the inside corner walls. The user locks both sets of arms 20 and 25, and 30 and 35 by tightening the fasteners 31, 32, thereby creating the requisite inside corner angle 140.

Subsequent to determining and locking the desired inside corner wall shape 140, the tool 10 is placed onto the deck 105 of a mitre saw 110, whereby the abutment surfaces 47 and 48 of arms 20 and 25 respectively are separately placed against the vertical fence 100 as shown in FIGS. 2A-2C. The mitre saw blade is then rotated to a position such that the blade and slide arm 15 (FIGS. 2A-2C) are aligned in the same plane. After the mitre tool 10 is removed, the molding to be cut is positioned against the vertical fence 100 for either right or left hand cuts.

Figure 2D:
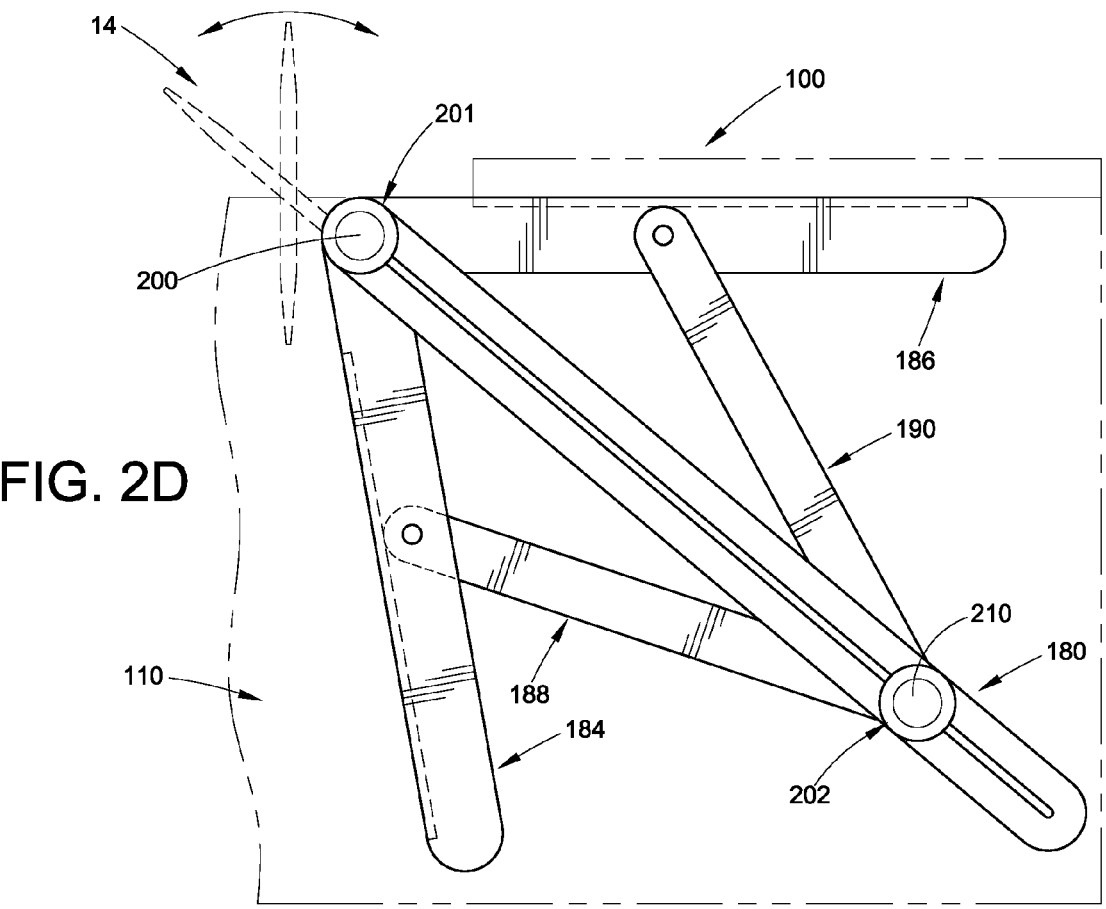
FIG. 2D is a plan view of the illustrative embodiment of the mitre tool incorporating a slotted slide arm as shown in FIG. 1D positioned on a saw deck for making right hand inside wall corner mitre cuts.
Figure 2E:
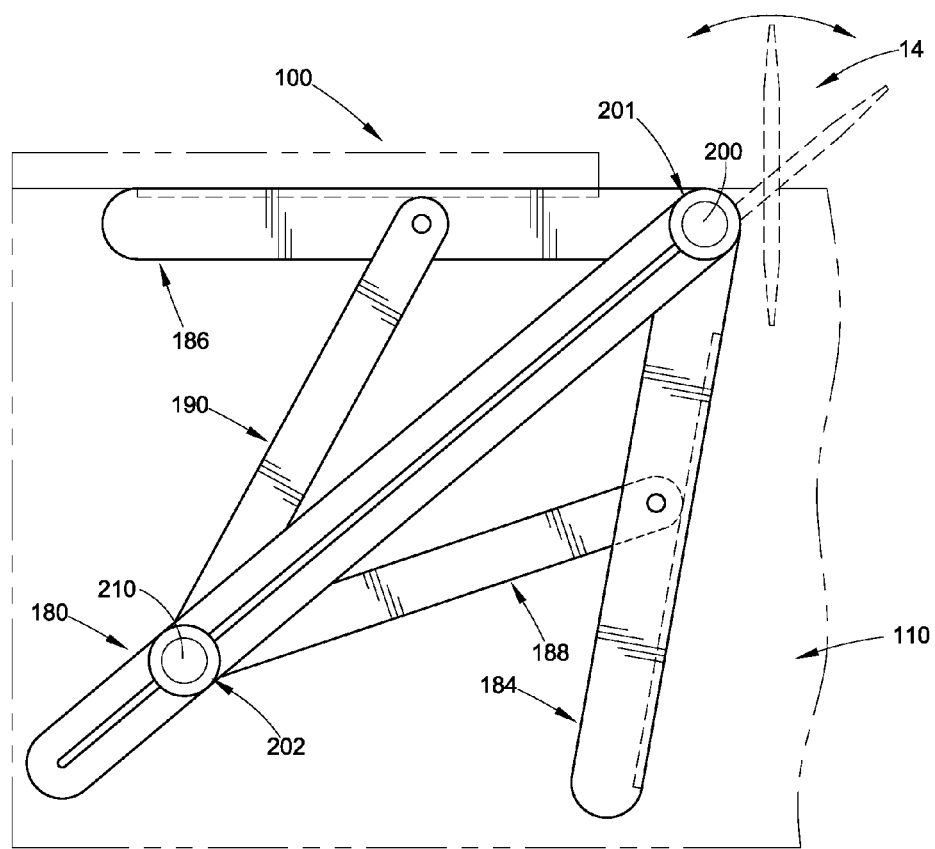
FIG. 2E is a plan view of the illustrative embodiment of the mitre tool incorporating a slotted slide arm as shown in FIG. 1D positioned on a saw deck for making right hand inside wall corner mitre cuts.

According to FIGS. 2D and 2E, subsequent to determining and locking the desired inside corner wall shape 140, the tool 14 is placed onto the deck 105 of a mitre saw 110, whereby the abutment surfaces arms 184 or 186 are separately placed against the vertical fence 100. The mitre saw blade is then rotated to a position such that the blade and slide arm 180 are aligned in the same plane. After the mitre tool 14 is removed, the molding to be cut is positioned against the vertical fence 100 for either right or left hand cuts.

To specifically create a mitre joint at an outside corner 120 as shown in FIG. 7, operation of the mitre tool 10 requires attachment of the space adapter 50, which is shown in FIGS. 3A-3C. As with measuring inside corner wall shapes, the user ensures that the tool 10 is in a position such that stop 2 of the one end of slide arm 15 is in contact with slide arm guide assemblies 6 and 7. Stop 4 of the opposite end of slide arm 15 is located closer to, but not in contact with, slide arm guides 6, 7. The user positions the abutment surfaces 47 and 48 of tool 10 against the outside corner walls. The user sets and locks both sets of arms 20 and 25, and 30 and 35 by tightening the fasteners 31, 32 at the east-west pivot points, thereby creating the requisite outside corner shape 150.

Subsequent to determining and locking the desired outside corner wall angle 150, the slide arm 15 on the tool 10 is moved to a position such that stop 4 is in contact with slide arm guides 6, 7. Then, the tool 10 is attached to the space adapter 50 prior to being placed onto the deck 105 of a mitre saw 110. Accordingly, vertical portions 40 and 42 of arms 20 and 25 of the mitre tool 10 comprise two pairs of holes 51-52 and 53-54 respectively. Similarly, vertical portion 90 of bar 60 of the space adapter 50 comprises a pair of fasteners 80 and 82. Therefore, mitre tool 10 can be mated with the space adapter 50 through the use of fasteners 80 and 82 that are in communication with holes 51, 52 and 53, 54 respectively resulting in contact between the inner abutment surfaces 96 and 97 of the mitre tool 10 and abutment surface 94 of the space adapter 50.

Figure 8A:
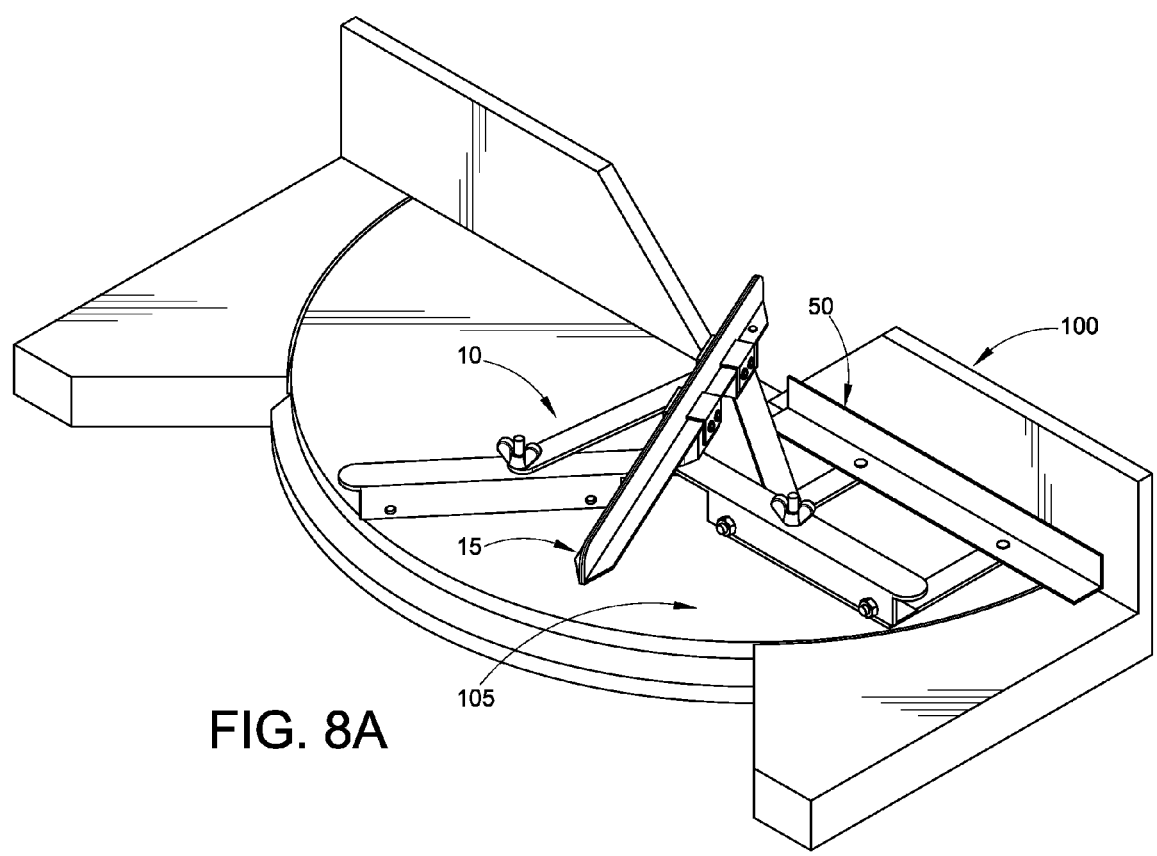
FIG. 8A is a perspective view of an illustrative embodiment of the mitre tool with space adapter attached positioned on a saw deck for cutting right hand outside corner mitres.
Figure 8B:
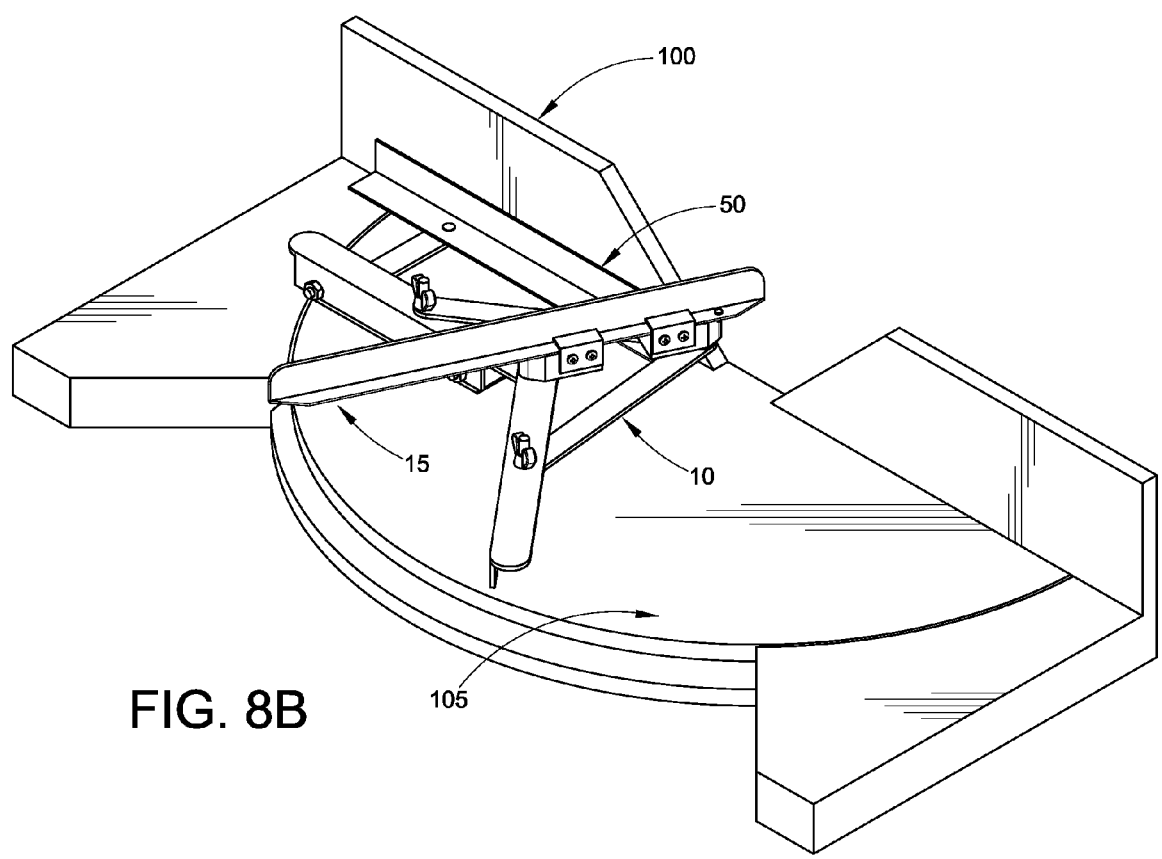
FIG. 8B is a perspective view of an illustrative embodiment of the mitre tool with space adapter attached positioned on a saw deck for cutting left hand outside corner mitres.

After attachment of the space adapter 50 to the mitre tool 10, the assembly is positioned onto the deck 105 of a mitre saw 110, whereby the abutment surface 89 of the arm 55 of the space adapter 50 is placed against the vertical fence 100 of a table saw 110 (as shown in FIGS. 8A and 8B). Slide the combined mitre tool 10 and space adapter 50 along the east-west vertical fence until the saw blade and slide arm 15 are aligned in the same plane. The mitre tool 10 is then removed from the saw deck. After the mitre tool 10 is removed, the molding to be cut is positioned against the vertical fence 100 for either right or left hand cuts and the molding is cut with the saw blade.

Figure 6A:
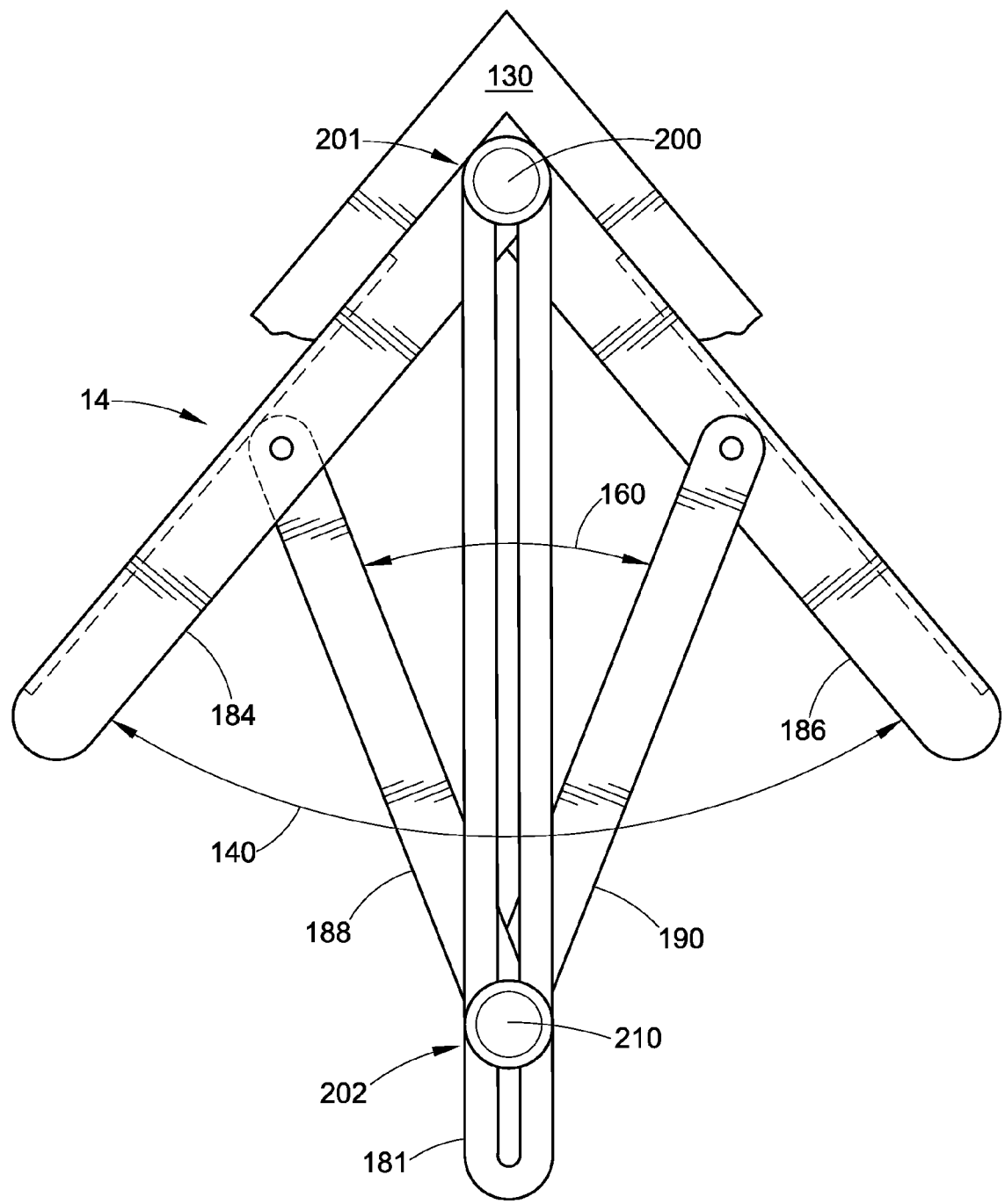
FIG. 6A is a plan view showing the position of another illustrative embodiment of the mitre tool engaged with an inside wall corner.

To specifically create a mitre joint at an inside corner 130 as shown in FIG. 6A using the embodiment of the device incorporating a slotted slide arm, the user first positions the abutment surfaces of arms 184, 186 of the mitre tool 14 against the inside corner walls. The user then locks both the first set of arms 184 and 186 with lockable guide 200 at pivot point 201, and second set of arms 188, 190 with lockable guide 210 a pivot point 202, thereby creating the requisite inside corner angle 140.

Subsequent to determining and locking the desired inside corner wall shape 140, the tool 10 is placed onto the deck 105 of a mitre saw 110, whereby the abutment surfaces of arms 184, 186 are separately placed against the vertical fence 100 as shown in FIGS. 2D and 2E. The mitre saw blade is then rotated to a position such that the blade and slide arm 180 are aligned in the same plane. After the mitre tool 14 is removed, the molding to be cut is positioned against the vertical fence 100 for either right or left hand cuts.

Figure 7A:
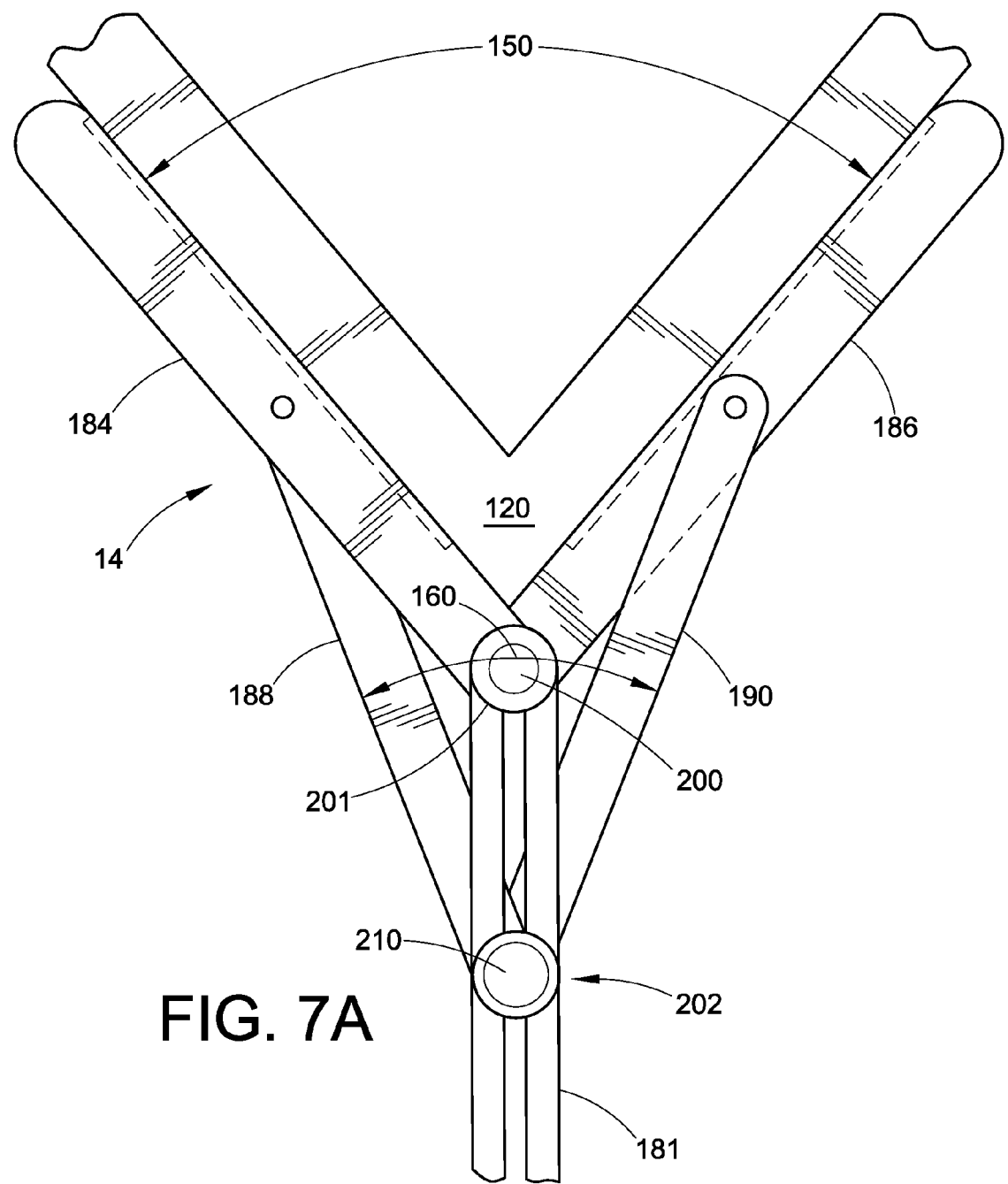
FIG. 7A is a plan view showing the position of another illustrative embodiment of the mitre tool engaged with an outside wall corner.

To specifically create a mitre joint at an outside corner 120 as shown in FIG. 7A using the embodiment of the device incorporating a slotted slide arm, operation of the mitre tool 14 requires attachment of the space adapter 50, 240, which is shown in FIGS. 3A-3F. The user first positions the abutment surfaces of arms 184, 186 of the mitre tool 14 against the inside corner walls. The user then locks both the first set of arms 184 and 186 with lockable guide 200 at pivot point 201, and second set of arms 188, 190 with lockable guide 210 a pivot point 202, thereby creating the requisite outside corner shape 150.

Figure 8C:
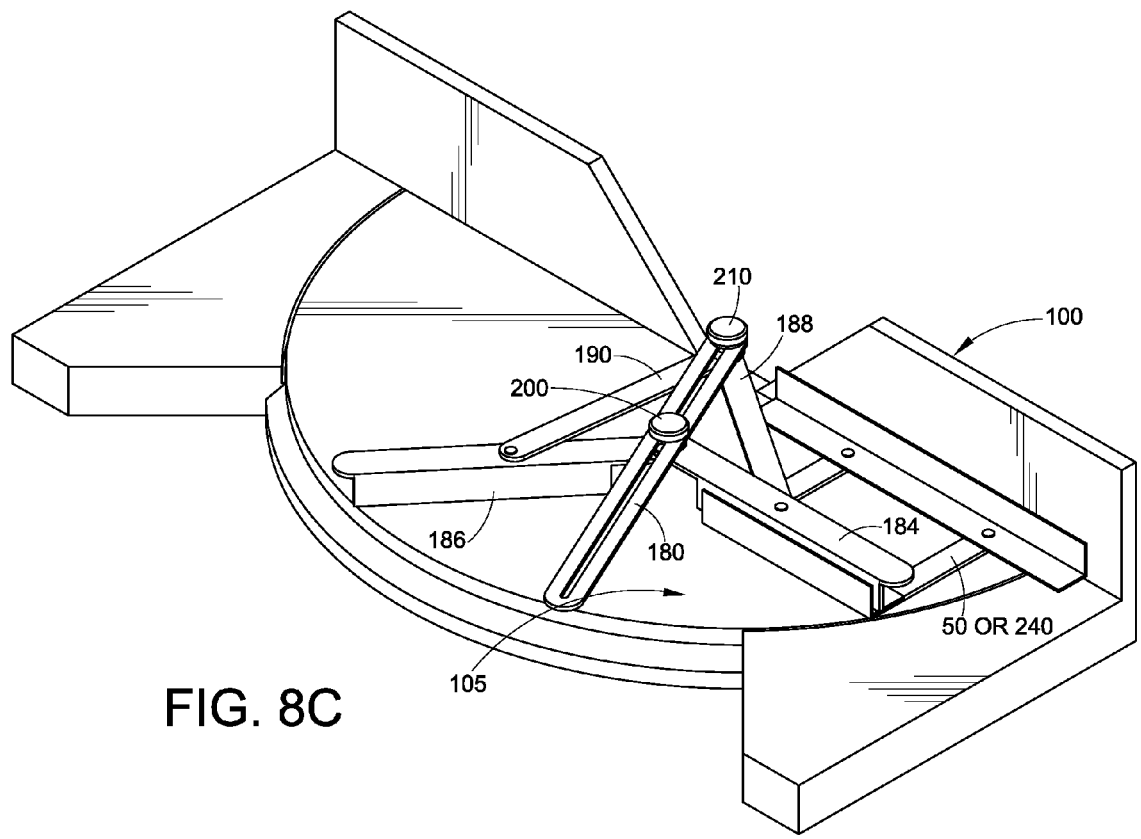
FIG. 8C is a perspective view of another illustrative embodiment of the mitre tool with space adapter attached positioned on a saw deck for cutting right hand outside corner mitres.
Figure 8D:
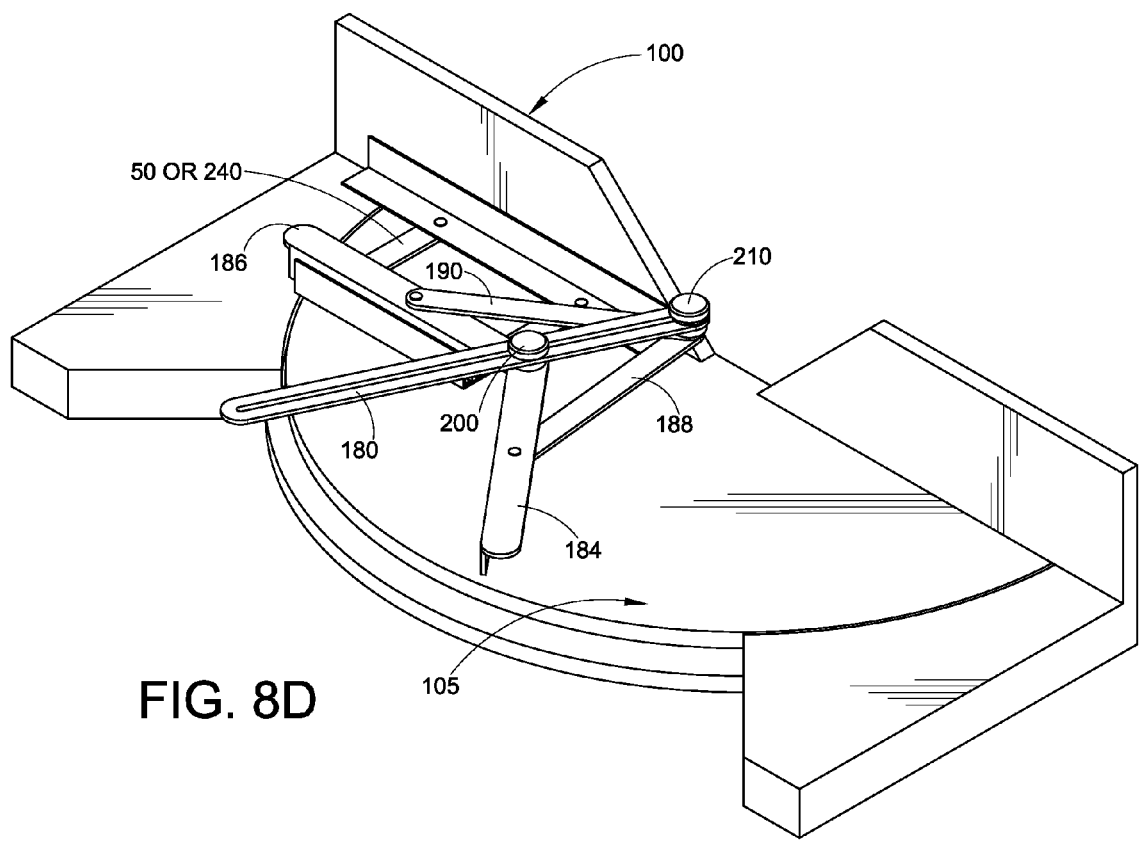
FIG. 8D is a perspective view of another illustrative embodiment of the mitre tool with space adapter attached positioned on a saw deck for cutting left hand outside corner mitres.

Subsequent to determining and locking the desired outside corner wall angle 150 and prior to being placed onto the deck 105 of a mitre saw 110, the mitre tool 14 is attached to the space adapter 50, 240. After attachment of the space adapter 50, 240 to the mitre tool 14, the assembly is positioned onto the deck 105 of a mitre saw 110, whereby the abutment surface of the arm 55 of the space adapter 50, 240 is placed against the vertical fence 100 of a table saw 110 (as shown in FIGS. 8C and 8D). Slide the combined mitre tool 14 and space adapter 50, 240 along the east-west vertical fence until the saw blade and slide arm 180 are aligned in the same plane. The mitre tool 14 is then removed from the saw deck. After the mitre tool 14 is removed, the molding to be cut is positioned against the vertical fence 100 for either right or left hand cuts and the molding is cut with the saw blade.

While the tool and method have been described above in connection with the certain illustrative embodiments, as shown in the drawing Figures, it is to be understood that other similar embodiments may be used or modifications and additions may be made to the described embodiments for performing the same function of the tool without deviating therefrom. Further, all embodiments disclosed are not necessarily in the alternative, as various embodiments may be combined to provide the desired characteristics. Variations can be made by one having ordinary skill in the art without departing from the spirit and scope of the disclosure.

I claim:

1. A mitre tool comprising:
   a plurality of pivotably connected arms, wherein said plurality of pivotably connected arms comprises a first set and a second set of pivotably attached arms, wherein said first set of arms is pivotably engaged with a first lockable guide member, wherein said second set of arms is pivotably engaged with a second lockable guide member, and wherein said first set of arms and said second sets of arms are pivotably attached to each other;
   a central member slidably engaged with said plurality of pivotably connected arms and comprising a longitudinally extending slot;
   wherein said arms of said first set of arms are substantially planar; and
   wherein said arms of said second set of arms comprise a planar portion and a bend portion.

2. The mitre tool of claim 1, wherein said bend portion of said second comprises a substantially 90 degree bend along portion of the longitudinal axis of said arms.

3. The mitre tool of claim 1, wherein the first ends of each of said arms of said first set of arms are pivotably engaged with a first lockable guide member and wherein each of said arms of said first set of arms are pivotably engaged to one of said arms of said second set of arms.

4. The mitre tool of claim 3, wherein the first set of arms comprises two arms.

5. The mitre tool of claim 3, wherein the second set of arms comprises two arms.

6. The mitre tool of claim 3, wherein both the first set of arms and the second set of arms comprise two arms.

7. The mitre tool of claim 1, wherein the first ends of each of said arms of said second set of arms are pivotably engaged with a second lockable guide member and wherein each of said arms of said second set of arms are pivotably engaged to one of said arms of said first set of arms.

8. The mitre tool of claim 7, wherein the mid-portion between opposite ends of each of said arms of said second set of arms are pivotably engaged to an end of one of said arms of said first set of arms.

9. The mitre tool of claim 1, wherein second lockable guide member is translatable along at least a portion of the longitudinal axis of said central slidable member.

10. The mitre tool of claim 1, comprising at least one locking mechanism for releasably locking the first set of arms and second set of arms in a desired position.

11. The mitre tool of claim 10, wherein said slidable central member bisects angles formed by the arms of said first set and said second set of arms when locked in said desired position.

12. The mitre tool of claim 1, wherein said slidable central member is not fixedly attached to any of the arms of said plurality of pivotably attached arms.

13. The mitre tool of claim 1, wherein said slot defines a cut line guide for a saw blade.

14. The mitre tool of claim 13, wherein said slidable central member is engaged with said lockable guide members, wherein said slidable member can translate between said lockable guide members.

15. The mitre tool of claim 1, wherein one arm of said second set of pivotably engaged arms is releasably connected to a space adapter.

16. The mitre tool of claim 15, wherein said space adapter comprises two sets of pivotably connected space adapter arms wherein a first set of space adapter arms are substantially planar and wherein a second set of space adapter arms are angled.

17. The mitre tool of claim 16, wherein first ends of the first set of space adapter arms are attached to a first space adapter arm of the second set of space adapter arms and wherein second ends of the first set of space adapter arms are attached to a second space adapter arm of the second set of space adapter arms.

18. A mitre tool comprising:
- a plurality of pivotably connected arms, wherein said plurality of pivotably connected arms comprises a first set and a second set of pivotably attached arms, wherein said first set of arms is pivotably engaged with a first lockable guide member, wherein said second set of arms is pivotably engaged with a second lockable guide member, said second lockable guide member is translatable along substantially the entire longitudinal axis of said slidable central member, and wherein said first set of arms and said second sets of arms are pivotably attached to each other;
- a central member slidably engaged with said plurality of pivotably connected arms and comprising a longitudinally extending slot; and
- wherein said slot defines a cut line guide for a saw blade.

19. The mitre tool of claim 18, wherein said slidable central member is engaged with said lockable guide members, wherein said slidable member can translate between said lockable guide members.

20. The mitre tool of claim 18, wherein one arm of said second set of pivotably engaged arms is releasably connected to a space adapter.

21. The mitre tool of claim 20, wherein said space adapter comprises two sets of pivotably connected space adapter arms wherein a first set of space adapter arms are substantially planar and wherein a second set of space adapter arms are angled.

22. The mitre tool of claim 21, wherein first ends of the first set of space adapter arms are attached to a first space adapter arm of the second set of space adapter arms and wherein second ends of the first set of space adapter arms are attached to a second space adapter arm of the second set of space adapter arms.

23. The mitre tool of claim 18, wherein said slidable central member is not fixedly attached to any of the arms of said plurality of pivotably attached arms.

24. A mitre tool comprising:
- a plurality of pivotably connected arms, wherein said plurality of pivotably connected arms comprises a first set and a second set of pivotably attached arms, wherein said first set of arms is pivotably engaged with a first lockable guide member, wherein said second set of arms is pivotably engaged with a second lockable guide member, and wherein said first set of arms and said second sets of arms are pivotably attached to each other;
- a central member slidably engaged with said plurality of pivotably connected arms and comprising a longitudinally extending slot; and
- wherein one arm of said second set of pivotably engaged arms is releasably connected to a space adapter.

25. The mitre tool of claim 24, wherein said space adapter comprises two sets of pivotably connected space adapter arms wherein a first set of space adapter arms are substantially planar and wherein a second set of space adapter arms are angled.

26. The mitre tool of claim 25, wherein first ends of the first set of space adapter arms are attached to a first space adapter arm of the second set of space adapter arms and wherein second ends of the first set of space adapter arms are attached to a second space adapter arm of the second set of space adapter arms.

27. The mitre tool of claim 24, wherein said slidable central member is not fixedly attached to any of the arms of said plurality of pivotably attached arms.

\* \* \* \* \*